(12) United States Patent
Schleucher et al.

(10) Patent No.: US 12,312,203 B2
(45) Date of Patent: May 27, 2025

(54) FREELY POSITIONABLE CLIP LINE FIXTURE FOR SECURING A FREE END OF A CLIP LINE TO A CLIP REEL

(71) Applicant: POLY-CLIP SYSTEM GMBH & CO. KG, Hattersheim (DE)

(72) Inventors: Heiko Schleucher, Gedern (DE); Alexander Guth, Gedern (DE)

(73) Assignee: POLY-CLIP SYSTEM GMBH & CO. KG, Hattersheim (DE)

( * ) Notice: Subject to any disclaimer, the term of this patent is extended or adjusted under 35 U.S.C. 154(b) by 754 days.

(21) Appl. No.: 17/491,267

(22) Filed: Sep. 30, 2021

(65) Prior Publication Data
US 2022/0106151 A1 Apr. 7, 2022

(30) Foreign Application Priority Data

Oct. 1, 2020 (EP) .................................... 20199663

(51) Int. Cl.
*B65H 65/00* (2006.01)
*A22C 11/12* (2006.01)
(52) U.S. Cl.
CPC ............ *B65H 65/00* (2013.01); *A22C 11/125* (2013.01)
(58) Field of Classification Search
CPC ...... B65H 75/28; B65H 75/285; B65H 65/00; A22C 11/125
See application file for complete search history.

(56) References Cited

U.S. PATENT DOCUMENTS

| 2,301,392 | A | 11/1942 | Funke |
| 2,822,919 | A | 2/1958 | Kulka |
| 3,400,897 | A | 9/1968 | Guernet |
| 4,189,819 | A | 2/1980 | Nicholson |
| 4,412,662 | A | 11/1983 | Rutecki |
| 4,579,785 | A | 4/1986 | Karoubas |

(Continued)

FOREIGN PATENT DOCUMENTS

| BE | 870241 A | 1/1979 |
| CN | 1109839 A | 10/1995 |

(Continued)

OTHER PUBLICATIONS

Federal Service for Intellectual Property; Application No. 2021128481; Search Report dated Mar. 24, 2022.

(Continued)

*Primary Examiner* — Sang K Kim
(74) *Attorney, Agent, or Firm* — Fitch, Even, Tabin & Flannery LLP

(57) ABSTRACT

The present invention provides a clip line fixture suitable for use with a clip line wound around a clip reel, the clip line fixture being configured to prevent the clip line from unwinding from the clip reel. The clip line fixture comprises at least one attachment portion shaped to removably attach the clip line fixture to at least one corresponding mating portion of a clip reel at a position along an outer rim portion of the clip reel. The clip line fixture further comprises a hold-down portion shaped to engage at least one corresponding portion of a clip line wound around the clip reel so as to prevent a free end portion of the clip line at least from radially separating from the clip reel. The present invention further provides a clip reel and a clip reel assembly.

15 Claims, 23 Drawing Sheets

(56) References Cited

U.S. PATENT DOCUMENTS

| | | | | |
|---|---|---|---|---|
| 5,549,257 | A | * | 8/1996 | Sanda .................. B65H 75/28 242/580 |
| 5,586,733 | A | * | 12/1996 | Miura .................. B65H 75/28 242/172 |
| 5,603,469 | A | * | 2/1997 | Stocchi .................. F16B 2/248 242/580 |
| 5,931,408 | A | * | 8/1999 | Ishii .................. B65H 75/28 242/125.3 |
| 6,131,846 | A | * | 10/2000 | Muenster ............... B65H 75/28 242/580 |
| 2011/0210215 | A1 | | 9/2011 | Nitsche et al. |
| 2011/0308192 | A1 | | 12/2011 | Kodi |

FOREIGN PATENT DOCUMENTS

| | | |
|---|---|---|
| CN | 1723153 A | 1/2006 |
| CN | 1899924 A | 1/2007 |
| CN | 202877277 U | 4/2013 |
| CN | 103588041 A | 2/2014 |
| CN | 105600620 A | 5/2016 |
| CN | 207046604 U | 2/2018 |
| CN | 107814276 A | 3/2018 |
| CN | 209259406 U | 8/2019 |
| CN | 209337886 U | 9/2019 |
| CN | 210253635 U | 4/2020 |
| DE | 202008011252 U1 | 10/2008 |
| EP | 1567418 B1 | 8/2005 |
| EP | 2374724 A1 | 10/2011 |
| EP | 2875840 A1 | 5/2015 |
| GB | 522295 A | 6/1940 |
| JP | S56-172583 U | 12/1981 |
| KR | 20-0446166 Y1 | 10/2009 |
| KR | 20150071178 A | 6/2015 |
| KR | 20160112083 A | 9/2016 |
| WO | 2005047114 A1 | 5/2005 |
| WO | 2016040232 A1 | 3/2016 |

OTHER PUBLICATIONS

EPO; Application No. 20199663.4; European Search Report dated Mar. 11, 2021.

EPO; Application No. 20 199 663.4; Examination Report dated Nov. 27, 2023.

INIPI; Application No. BR102021019632-7; Examination Report dated Jan. 10, 2024.

CNIPA; Application No. 202111140941.1; Second Office Action issued May 15, 2024.

CNIPA; Application No. 202111140941.1; First Office Action issued Dec. 13, 2023.

\* cited by examiner

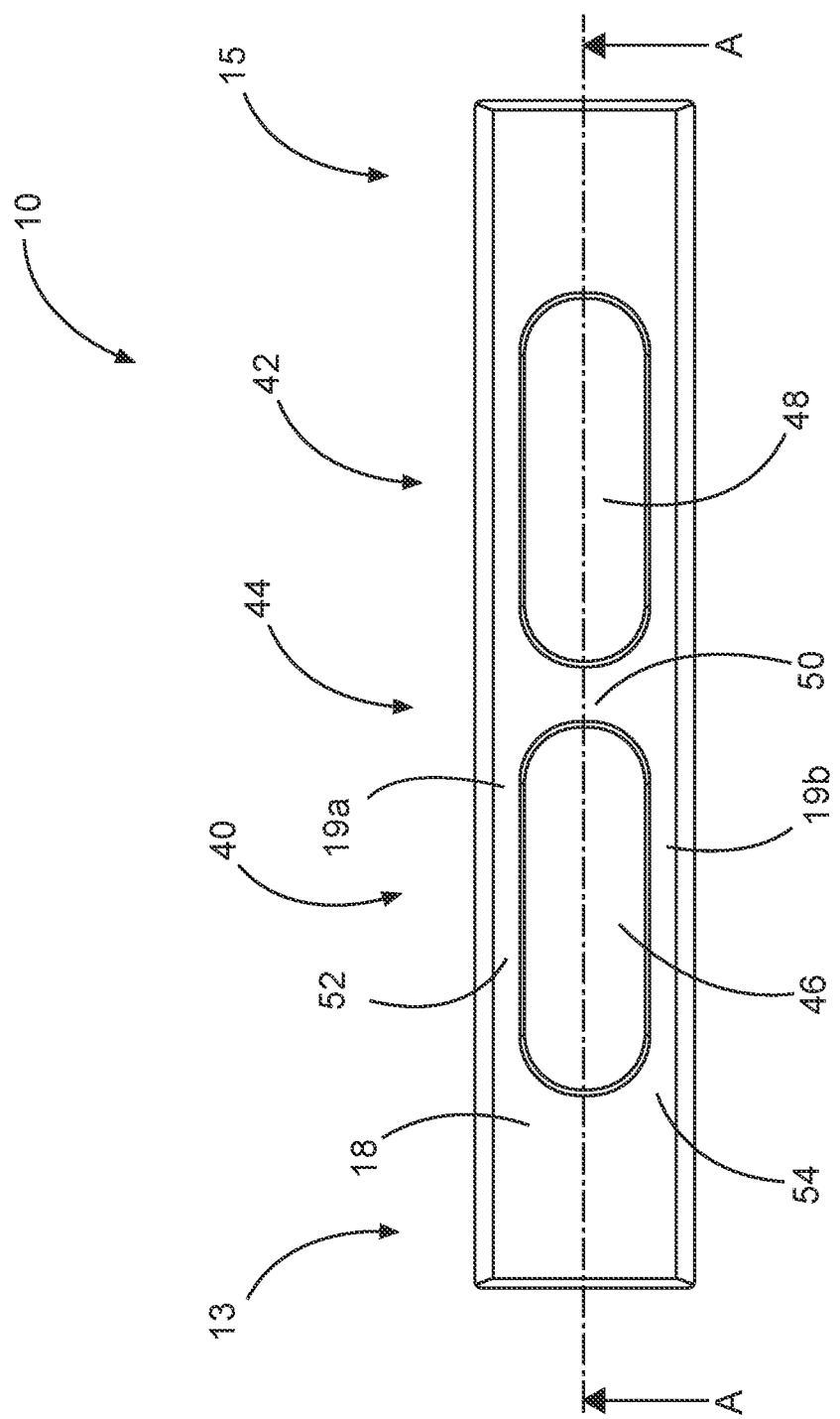

FREELY POSITIONABLE CLIP LINE FIXTURE FOR SECURING A FREE END OF A CLIP LINE TO A CLIP REEL

CROSS-REFERENCE TO RELATED APPLICATION

The present application claims the benefit of priority of European Patent Application No. 20199663.4 filed on Oct. 1, 2020, the content of which is incorporated herein by reference in its entirety.

FIELD OF THE INVENTION

The present invention generally relates to devices for use in the production of sausage-like products. In particular, the present invention provides a clip line fixture suitable for use with a clip line wound around a clip reel, to a clip reel for storing a wound clip line thereon, and to a clip reel assembly comprising a clip reel, a clip line wound around the clip reel and a clip line fixture.

BACKGROUND OF THE INVENTION

In practice, it is known that, for example in the production of sausage-shaped products, like sausages, filling material is fed by a filling machine through a filling tube forming a component of filling means of a clipping machine into a tubular packaging casing which is stored on the filling tube and which is closed at its front end, i.e. the end pointing in the feeding direction of the filling material by a closure means, like a closure clip.

Said closure clips are provided to the clipping machine in the form of a clip line of consecutively arranged individual closure clips, in practice typically designated as R clips. When viewed from the side, the clip line may have a wave shape with regularly arranged elevations or peaks and indentations or troughs.

The clip line is typically stored wound around a clip reel, from which the clip line is unwound and fed to the clipping machine. Such reels comprise a central hub for being connected to a corresponding axle of the clipping machine and rotate around said axle when unwinding the clip line. In order to refill a supply of clips of the clipping machine, or to change the type of clips supplied to the clipping machine, the clip reels are replaceable. During storage and transportation of the clip reel, a free end of the clip line wound thereon has to be secured against separating from the clip reel so as to prevent the clip line from unwinding and/or to avoid interlocking with other reels or objects. A popular type of clips is formed from a continuous string of metal wire, which may comprise sharp edges or other features that potentially pose a hazard. A particular risk may result from a free end of such a metal wire clip line. It is therefore further desired to secure the free end of such clip line to reduce the risk of workplace injury.

European patent publication EP 1 567 418 A1 discloses a reel comprising a metal clip line and a separate securing element which forms a releasable connection of the metal clip line in the region of its free end to a portion of the metal clip line belonging to another winding so that the free end is secured to prevent it from unwinding.

While the described above known securing element provides an adequate way of securing a free end of a mental clip line, particularly compared to the common practice of securing the free end with a piece of tape, there remains the need for improved securing means.

SUMMARY OF THE INVENTION

As will be detailed hereafter, the present invention satisfies the described above needs for improved securing of a free end of a clip line to a clip reel while providing additional advantages over known securing elements.

In a first aspect of the present invention, a clip line fixture suitable for use with a clip line wound around a clip reel is provided. The clip line fixture comprises at least one attachment portion configured to be removably attachable to a mating portion of a clip reel for attaching the clip line fixture to the clip reel. The clip line fixture further comprises a hold-down portion comprising at least one flexible engagement element shaped to engage at least one corresponding portion of a free end portion of the clip line wound around the clip reel. The at least one attachment portion and the hold-down portion are configured such that the free end portion of the clip line wound around the clip reel is securable at least against radially separating from the clip reel by attaching the at least one attachment portion to the mating portion.

The clip line fixture of the first aspect of the present invention is particularly advantageous in that securing of the free end of the clip line is achievable in the single step of removably attaching the clip line fixture to a selected position along the mating portion of the clip reel, therefore providing a fast and convenient way of attachment.

It has to be understood that the radial direction is defined with respect to a winding axis of clip line, i.e. the radial direction is perpendicular thereto. In some embodiments, the free end portion of the clip line is considered to have radially separated from the clip if the free end portion of the clip line radially extends beyond a radially outermost portion of the clip reel, such as an outer rim of a side wall of the clip reel. In other embodiments, the free end portion of the clip line is considered to have radially separated from the clip if the free end portion of the clip line separates from an outer circumferential surface of a hub portion of the clip reel, or from another portion of the same clip reel, onto which the free end portion is wound.

In a preferred embodiment of the first aspect of the present invention, the engagement portion is configured to be brought into engagement with the corresponding portion of the clip reel by attaching the attachment portion to the mating portion of the clip reel.

Alternatively or additionally, the engagement portion is configured to secure the free end portion of the clip line at least from radially separating from the clip reel by engaging the corresponding portion. For example, a radial degree of freedom of the free end portion of the clip line is physically blocked by the at least one flexible engagement element engaging the at least one corresponding portion of the free end portion and biasing it against the clip reel. In further or additionally preferred embodiments, the at least one engaging element comprises at least one interlocking member configured to interlock with the at least one corresponding portion of the clip line.

Alternatively or additionally, the attachment portion is configured such that the clip line fixture is attachable to the clip reel at a position freely choosable along the correspondingly adapted at least one corresponding mating portion. It is particularly preferred when the attachment portion is configured such that the clip line fixture is attachable to the clip reel at a position freely choosable along a circumferential direction of the clip reel. A position of the clip line fixture relative to the clip line, and thus the portion of the clip line which can be engaged by the at least one flexible engagement portion of the hold-down portion, is determined by the selected position of the attachment of the clip line fixture to the clip reel. Thereby, the free end portion of the clip line can advantageously be secured to the clip reel irrespective of the circumferential position of the free end portion. For example, the mating portion of the clip reel is provided extending along an outer rim portion of the clip reel, preferably extending around the full circumference of the clip reel.

Alternatively or additionally, the at least one flexible engagement element is configured to constrain a radial degree of freedom of the free end of the clip line at least such that the free end is confined to a space of the clip reel limited by a radial outermost portion of the clip reel, also referred to as outer rim portion of the clip reel. Preferably, the space is a clip line winding space of the clip reel.

Alternatively or additionally, the hold-down portion is configured to at least partially constrain the radial degree of freedom of the free end of the clip line. For example, in cases in which the hold-down portion is configured to only partially constrain the radial degree of freedom of the free end portion of the clip line, i.e. in which a radial movement of the free end portion is possible radially within the radial outermost portion of the clip reel, the corresponding portion of the free end portion comes into engagement with the at least one flexible engagement element of the hold-down portion once the free end has moved to the radial most position allowed by the clip line fixture. In other cases, in which the radial degree of freedom of the free end portion is fully constrained, the corresponding portion of the free end portion is in permanent engagement with the at least one flexible engagement element of the hold-down portion. It has to be understood that the same embodiment of a clip line fixture may partially constrain the radial degree of freedom in one situation, and fully constrain the radial degree of freedom in another situation. For example, before removing the clip line fixture from the clip reel, the at least one flexible engagement element is in permanent engagement with the corresponding portion. The clip line fixture is then removed, and the clip line is partially consumed, thus putting the new free end portion at a position radially closer to the central axis of the clip reel. After re-attaching the clip line fixture to the clip reel, the length of the flexible engagement element may not suffice to permanently engage the new free end portion, but still ensures that the radial degree of freedom of the new free end portion is limited once it moves into engagement with the at least one flexible engagement element.

Preferably, the clip line fixture is configured such that the at least one flexible engagement element can exert a radially inward directed force on the corresponding portion of the clip line. Thereby, the clip line may advantageously be biased against the clip reel, thus fully constraining a radial degree of freedom of the clip line.

Alternatively or additionally, the clip line fixture is configured to constrain the free end portion of the clip line in the circumferential direction.

Alternatively or additionally, the clip line comprises an undulating pattern of alternating peaks and troughs, wherein the at least one engagement element is configured to engage one or more troughs and/or one or more peaks of the clip line. In other words, in such embodiments, the corresponding portion of the free end portion of the clip line is provided by one or more troughs and/or one or more peaks of the clip line.

Alternatively or additionally, the clip line fixture further comprises a base portion connecting the at least one attachment portion and the hold-down portion. Alternatively or additionally, the clip line fixture is configured to be attached to the clip reel such that the base portion extends at least approximately in an axial direction of the clip reel. Alternatively or additionally, the base portion has a substantially longitudinal shape, preferably a rectangular shape. Alternatively or additionally, a lengthwise dimension or length of the base portion is 30 mm or larger, 35 mm or larger, 40 mm or larger, 45 mm or larger, 50 mm or larger, 55 mm or larger, 60 mm or larger, or 65 mm or larger. Alternatively or additionally, a width of the base portion is 5 mm or larger, 6 mm or larger, 7 mm or larger, 8 mm or larger, 9 mm or larger, 10 mm or larger, 11 mm or larger, 12 mm or larger, or 13 mm or larger. It has to be understood, however, that in other embodiments the at least one attachment portion is directly attached to the hold-down portion, without the need for a base portion for connecting the at least one attachment portion and the hold-down portion.

Alternatively or additionally, the clip line fixture is configured to be attached to the clip reel such that the at least one flexible engagement element extends from the base portion radially inward with respect to the clip reel. Alternatively or additionally, the hold-down portion comprises a first flexible engagement portion and a second flexible engagement portion.

In principle, it may be sufficient for the clip line fixture to have only one attachment portion, which is attached to one mating portion of the clip reel. Such a case is conceivable in particular if the axial distance between the side walls of a clip reel is relatively small. In a preferred embodiment, the at least one attachment portion is provided at a side portion of the clip line fixture. Preferably, and in particular for clip reels having a relatively big distance between the side walls in the axial direction, a first attachment portion is provided at a first side portion of the clip line fixture, and a second attachment portion is provided at a second side portion of the clip line fixture, the second side portion being opposite the first side portion. Alternatively or additionally, the clip line fixture is configured to be attached to the clip reel such that the first side portion and the second side portion are aligned in an axial direction of the clip reel.

Alternatively or additionally, the clip line fixture comprises a first attachment portion at the first side portion and a hinge portion at the second side portion. The hinge portion is configured to pivotally attach the clip line fixture to the clip reel. Preferably, the first attachment portion is detachable from the first mating portion of the clip reel by pivoting the clip line fixture around the hinge portion. In some embodiments, the hinge portion is configured to removably attach to the second mating portion of the clip reel. Preferably, the hinge portion is configured to be displaceable along the circumferential direction of the clip reel when attached to the clip reel. In further preferred or additional embodiments, the hinge portion is permanently attached to the clip reel, for example when the clip line fixture is an integral part of the clip reel. In other preferred embodiments, the first and/or second attachment portion is configured to act as the hinge portion.

Alternatively or additionally, the base portion extends between the first and second attachment portion. Preferably, the base portion is configured to provide a bridging distance between the first attachment portion and the second attachment portion for bridging a separation between a first mating portion and a second mating portion of the clip reel so that the attachment portions can easily be positioned at the respective mating portions of the clip reel. Preferably, the base portion is configured to provide a variable bridging distance. This can be achieved, for example, by making the base portion from a relatively flexible material, so that when the clip line fixture is to be attached, the base portion, in particular between the two attachment portions, can bulge or be deformed otherwise in order to be able to attach easily the two attachment portions to the corresponding mating portions of the side walls according to the axial distance between the side walls. However, any other conceivable solution for achieving a variable bridging distance is possible.

Alternatively or additionally, the base portion comprises at least a first flexible portion, a second flexible portion and at least one stiffening portion provided between the first flexible portion and the second flexible portion. The flexible portions allow, in particular, when the clip line fixture is attached to the reel, the base portion to deform in a direction parallel to the reel axis, allowing the fixture to adapt to the axial distance between the side walls of the clip reel.

Alternatively or additionally, the at least one flexible engagement element extends laterally from the base portion. Alternatively or additionally, the at least one flexible engagement element extends non-coaxially with a longitudinal axis of the base portion. Alternatively or additionally, at least an extension of a longitudinal axis of the at least one flexible engagement element and an extension of a longitudinal axis of the base portion intersect.

Alternatively or additionally, the at least one flexible engagement element of the hold-down portion is configured to engage a corresponding trough of the clip line.

Alternatively or additionally, the at least one flexible engagement element is of a substantially longitudinal shape. Alternatively or additionally, the at least one flexible engagement element is a pin-like element. Alternatively or additionally, the at least one flexible engagement element is a plate-like element wherein the plate-like element extends at least approximately in the longitudinal direction of the hold-down portion. Of course, several plate-like elements can also be provided directly adjacent to each other or spaced apart.

Alternatively or additionally, a length of a flexible engagement element is 20 mm or larger, 22 mm or larger, 24 mm or larger, 26 mm or larger, 28 mm or larger, or 30 mm or larger. Alternatively or additionally, a width of a flexible engagement element is 1 mm or larger, 1.2 mm or larger, 1.4 mm or larger, 1.6 mm or larger, 1.8 mm or larger, 2 mm or larger, 2.2 mm or larger, or 2.4 mm or larger. Alternatively or additionally, a thickness of a flexible engagement element is 0.3 mm or larger, 0.5 mm or larger, 0.7 mm or larger, 0.9 mm or larger, 1.1 mm or larger, or 1.3 mm or larger.

Alternatively or additionally, the at least one flexible engagement element is of substantially longitudinal shape and comprises a fixed end and a free end opposite the fixed end. Preferably, the fixed end is attached to the base portion. Preferably, each of the at least one flexible engagement element is configured such that the free end is deflectable. More preferably, the at least one flexible engagement element is configured to be deflectable in a plane perpendicular to an axial direction of the clip reel. Alternatively or additionally, the at least one flexible engagement element is configured to be deflectable in a plane perpendicular to a direction defined between the first side portion and the second side portion of the clip line fixture. Alternatively or additionally, the at least one flexible engagement element is configured to be deflectable in a plane perpendicular to a longitudinal axis of the base portion.

Alternatively or additionally, the at least one flexible engagement element has a variable length. Preferably, the at least one flexible engagement element is configured to telescope. Alternatively or additionally, the free end of the at least one flexible engagement element comprises a soft tip. Preferably, the soft tip comprises a soft material. Alternatively or additionally, the flexible tip comprises a soft material that is softer than a material of the remainder of the flexible engagement element. Alternatively or additionally, the soft material comprises an elastomer. Alternatively or additionally, the soft material comprises a foam. Preferably, the stiffness of the soft material is 50% or smaller, 40% or smaller, 30% or smaller, 20% or smaller, 10% or smaller, 5% or smaller, 4% or smaller, 3% or smaller, 2% or smaller, or 1% or smaller compared to the stiffness of the material of the remainder of the flexible engagement element.

Alternatively or additionally, the clip line fixture comprises a plurality of flexible engagement elements. Preferably, the flexible engagement elements are configured to vary in length with respect to each other. Alternatively or additionally, the plurality of flexible engagement elements are axially displaceable with respect to each other.

In principle, the plurality of flexible engagement elements can be provided by the hold-down portion in any desired way or pattern. For example, the hold-down portion can provide a plurality of flexible engagement elements that are arranged in the form of a brush and/or that are provided in a completely random manner by the hold-down portion. Alternatively or additionally, the plurality of flexible engagement elements is arranged to form at least one row of flexible engagement elements. Preferably, two adjacent flexible engagement elements of the at least one row of flexible engagement elements are in contact with each other. Alternatively or additionally, two adjacent flexible engagement elements of the at least one row of flexible engagement elements are provided in a gapless arrangement.

Alternatively or additionally, the plurality of flexible engagement elements is arranged in a comb-like pattern to form at least one row of flexible engagement elements. In this context, a comb-like pattern is defined by a series of longitudinal engagement elements separated by respective gaps. Preferably, a width of the gaps is constant. Alternatively or additionally, the gap width is adapted to a width of a clip line to be secured by the clip line fixture. Alternatively or additionally, the gap width and the width of the elongate flexible engagement elements are identical in size. Alternatively or additionally, the sum of the gap width and the width of the flexible engagement elements substantially equals a width of a clip line to be secured by the clip line fixture. In further preferred or alternative embodiments, the width of the flexible engagement elements is smaller than or larger than the gap width. Alternatively or additionally, the gap width is 1 mm or larger, 1.2 mm or larger, 1.4 mm or larger, 1.6 mm or larger, 1.8 mm or larger, 2 mm or larger, 2.2 mm or larger, or 2.4 mm or larger. Alternatively or additionally, a ratio of the width of the longitudinal elements to the gap width is 0.5 or larger, 0.6 or larger 0.7 or larger, 0.8 or larger 0.9 or larger, 1 or larger, 1.1 or larger, 1.2 or larger, 1.3 or larger, 1.4 or larger, or 1.5 or larger. It is particularly preferred that the at flexible engagement elements of the at least one row of flexible engagement elements are pin-like elements.

Alternatively or additionally, the clip line fixture is configured to be attached to the clip reel such that at least one row of flexible engagement elements extends at least substantially in a circumferential direction of the clip reel. Preferably, the clip line fixture is configured to be attached to the clip reel such that each of the at least one flexible engagement element of the at least one row of flexible engagement elements extends in a direction having at least a component in an axial direction of the clip reel.

Alternatively or additionally, the clip line fixture is configured to be attached to the clip reel such that each of the at least one flexible engagement element of the at least one row of flexible engagement elements extends in a direction having at least a component in a radial direction of the clip reel.

Alternatively or additionally, the clip line fixture is configured to be attached to the clip reel such that at least one row of flexible engagement elements is aligned with a direction that extends at least substantially in an axial direction of the clip reel. Preferably, the clip line fixture is configured to be attached to the clip reel such that each of the at least one flexible engagement element of the at least one row of flexible engagement elements extends in a direction having at least a component in a circumferential direction of the clip reel.

Alternatively or additionally, the flexible engagement elements in the at least one row of flexible engagement elements are lined up in parallel to an orientation direction defined between the first side portion and the second side portion of the clip line fixture. Alternatively or additionally, in particular when arranged in a comb-like pattern as discussed above, the comb-like pattern forms a first row of flexible engagement elements and a second row of flexible engagement elements. Preferably, the flexible engagement elements of the first row of flexible engagement elements and the flexible engagement elements of the second row of flexible engagement elements are lined up in parallel to an orientation direction defined between the first side portion and the second side portion of the clip line fixture.

Alternatively or additionally, at least one of the flexible engagement elements in the at least one row of flexible engagement elements extends in a direction different from a direction in which the remainder of the flexible engagement elements in the at least one row of flexible engagement elements extend. Preferably, each of the flexible engagement elements in the at least one row of flexible engagement elements extends in a different direction.

Alternatively or additionally, the clip line fixture comprises at least a first flexible engagement portion and a second flexible engagement portion, wherein each of the first and second flexible engagement portions comprises at least one flexible engagement element. Preferably, the first flexible engagement portion comprises a first row of flexible engagement elements, and the second flexible engagement portion comprises a second row of flexible engagement elements. More preferably, the first and second row of flexible engagement elements are arranged in a comb-like pattern.

Alternatively or additionally, the gaps between adjacent flexible engagement elements arranged in a comb-like pattern are filled with an elastic material. This may allow deformation of the hold-down portion or the base portion to adjust the distance of the clip line fixture to be bridged between the side walls of a clip reel. Preferably, the elastic material is significantly softer than a material of the flexible engagement elements. Alternatively or additionally, the elastic material comprises an elastomer. Alternatively or additionally, the elastic material comprises a foam. Preferably, the stiffness of the elastic material is 50% or smaller, 40% or smaller, 30% or smaller 20% or smaller, 10% or smaller, 5% or smaller, 4% or smaller, 3% or smaller, 2% or smaller, or 1% or smaller compared to the stiffness of the material of the remainder of the flexible engagement element.

Alternatively or additionally, the first flexible engagement portion and the second flexible engagement portion extend in parallel to one another. Preferably, a distance between the parallel first flexible engagement portion and the second flexible engagement portion is 5 mm or larger, 6 mm or larger, 7 mm or larger, 8 mm or larger, 9 mm or larger, 10 mm or larger, 11 mm or larger, 12 mm or larger, or 13 mm or larger.

Alternatively or additionally, the first flexible engagement portion and the second flexible engagement portion extend in different directions enclosing an angle of 120° or less. Preferably, the first flexible engagement portion and the second flexible engagement portion enclose an angle of 15° or more and/or 75° or less. More preferably, the first flexible engagement portion and the second flexible engagement portion enclose an angle of 35° or more and/or 65° or less. Alternatively or additionally, a distance between the base portions of the flexible engagement elements in the first flexible engagement portion and the base portions of the flexible engagement elements in the second flexible engagement portions is 5 mm or larger, 6 mm or larger, 7 mm or larger, 8 mm or larger, 9 mm or larger, 10 mm or larger, 11 mm or larger, 12 mm or larger, or 13 mm or larger.

Alternatively or additionally, each of the at least one attachment portion provides a clamp segment shaped to releasably mate with the corresponding mating portion of the clip reel through positive locking, also referred to as form closure, and/or force locking, also referred to as traction closure.

Alternatively or additionally, the clamp segment comprises an inner clamping arm and an outer clamping arm. Preferably, one of the inner arm and the outer arm is angled toward the respective other of the inner arm and the outer arm. In a preferred embodiment, the clamp segment can be provided with at least one spring element in the form of a metallic leaf spring, for example, which can be worked into the material of the clamp segment.

According to a second aspect of the present invention, a clip reel for storing a clip line wound thereon is provided, which is configured for use with a clip line fixture of the first aspect of the present invention. The clip reel comprises a hub portion defining a central axis, a first side wall and a second side wall. Each of the first and second side wall extend radially outward from an outer circumferential surface of the hub portion. The first side wall and the second side wall are axially spaced so as to define a clip line winding space therebetween. The clip reel further comprises a first mating portion provided by the first side wall and a second mating portion provided by the second side wall, each mating portion configured for removably attaching a correspondingly shaped attachment portion of the clip line fixture of the first aspect of the present invention to the clip reel. Each of the first mating portion and the second mating portion comprise a bulge extending along an outer rim portion of the corresponding side wall. Moreover, at least one of, preferably each of the first mating portion and the second mating portion comprises a circumferentially extending locking groove provided in the corresponding side wall.

In preferred embodiments of the second aspect of the present invention, the circumferentially extending locking groove is provided in a single section extending continuously along the circumferential direction. In other preferred embodiments, the circumferentially extending locking groove is provided in a single section extending only partially along the circumferential direction. In other preferred embodiments, the circumferentially extending locking groove is discontinuous and comprises a plurality of subsequently arranged circumferentially extending sections.

Alternatively or additionally, the circumferentially extending locking groove of the first mating portion and/or the second mating portion is arranged radially inward from and preferably immediately adjacent to the corresponding bulge.

Alternatively or additionally to the circumferentially extending locking groove, the clip reel further comprises a clip line fixture holder separate from the first mating portion and the second mating portion. The clip line fixture holder is configured to releasably attach the clip line fixture to the clip reel in a position that enables unwinding of the clip line. The clip line fixture holder can be used to store the clip line fixture on the clip reel when the reel is used in a clipping machine.

Alternatively or additionally to the circumferentially extending locking groove, the clip reel further comprises at least one storing recess provided in at least one of the first and second side wall, preferably at least one storing recess in each of the first and second side wall and/or a plurality of storing recesses circumferentially spaced about at least one of the first and second side wall. The at least one storing recess is configured to at least partially receive a clip line fixture, preferably a clip line fixture according to the first aspect, attached to at least one of the first or second mating portion in a release position in which a free end of a clip line wound around the clip line is not secured. In particularly preferred embodiments, the storing recess is further configured to enable the clip line fixture to pivot from the release position to a securing position in which the free end of the clip line is secured to the clip reel.

In a third aspect of the present invention, a clip reel assembly is provided comprising a clip reel, preferably a clip reel of the second aspect of the present invention, a clip line wound around the clip reel so as to be located in the clip line winding space of the clip reel, and a clip line fixture of the first aspect of the present invention removably attached to the clip reel. The clip reel at least comprises a hub portion defining a central axis, a first side wall and a second side wall. Each of the first and second side wall extend radially outward from an outer circumferential surface of the hub portion. The first side wall and the second side wall are axially spaced so as to define a clip line winding space therebetween.

Alternatively or additionally, the at least one attachment portion of the clip line fixture is removably attached to a corresponding mating portion of the clip reel. Preferably, the hold-down portion of the clip line fixture engages at least one corresponding portion of the clip line, thereby preventing the clip line at least from radially separating from the clip reel.

In a fourth aspect of the present invention a clip reel assembly is provided comprising a clip reel of the second aspect of the present invention, a clip line wound around the clip reel so as to be located in the clip line winding space of the clip reel, and a clip line fixture of the first aspect of the present invention. The clip line fixture is releasably attached to the clip line fixture holder of the clip reel, thereby allowing to unwind the clip line from the clip reel.

Preferred embodiments of the present invention will be described in the following together with the drawings listed below. Further advantages, implementations and embodiments of the first, second, third and fourth aspect of the present invention will be detailed therein. The following description together with the drawings are therefore fully referenced for the purpose of detailing the previous description of the first, second, third and fourth aspect of the present invention. It has to be understood that any of the individual features described in the following and/or shown in the drawings can be combined with, or replace corresponding features of, any of the embodiments of the first, second, third or fourth aspect discussed above. Moreover, it has to be understood that the fact that a certain feature is recited by an independent claim and/or the description of any of the first, second, third or fourth aspects of the present invention, is not sufficient to indicate whether or not the feature is an essential feature.

If not indicated otherwise, expressions such as "up", "down", "above", "below", "on top", "beneath" or analogous expressions for a relative spatial position along a vertical axis are defined relative to a viewer's perspective on the drawings. If not indicated otherwise, the viewer's perspective on the drawings is such that the "up" and "down" direction coincide with the natural up and down direction, i.e. the "down" direction corresponds to the direction of gravity. Therefore, if not indicated otherwise, expressions such as "down", "below", "beneath" or analogous expressions relate to a relative position in the direction of gravity, and "up", "above", "on top" or analogous expressions relate to a relative position opposite the direction of gravity.

If not indicated otherwise, expressions such as "in front", "behind", "left" and "right" or analogous expressions for a spatial position relative to a viewer are defined relative to the viewer's perspective view on the drawings, wherein "in front" or analogous expressions relate to a relative position closer to the viewer, and "behind" or analogous expressions relate to a relative position further away from the viewer.

BRIEF DESCRIPTION OF THE DRAWINGS

In the drawings:

FIG. 2c: is a top view of the clip line fixture depicted in FIG. 1;

FIG. 7b: is an enlarged detail of the cut of FIG. 7a;

FIG. 13b: is a frontal view of the embodiment of FIG. 13a;

DETAILED DESCRIPTION OF EMBODIMENTS DEPICTED IN THE DRAWINGS

In the following, preferred embodiments of the present invention are described in reference to the appended figures. It has to be understood that additional and/or alternative advantages, implementations and embodiments disclosed in the following are not limited to the individual combination of features described hereafter and/or shown in the figures. Instead, such additional and/or alternative advantages, implementations and embodiments apply to, can be combined with, and/or can replace corresponding features of any or all of the general aspects and embodiments of the first, second, third and fourth aspect of the present invention described above.

Figure 1:
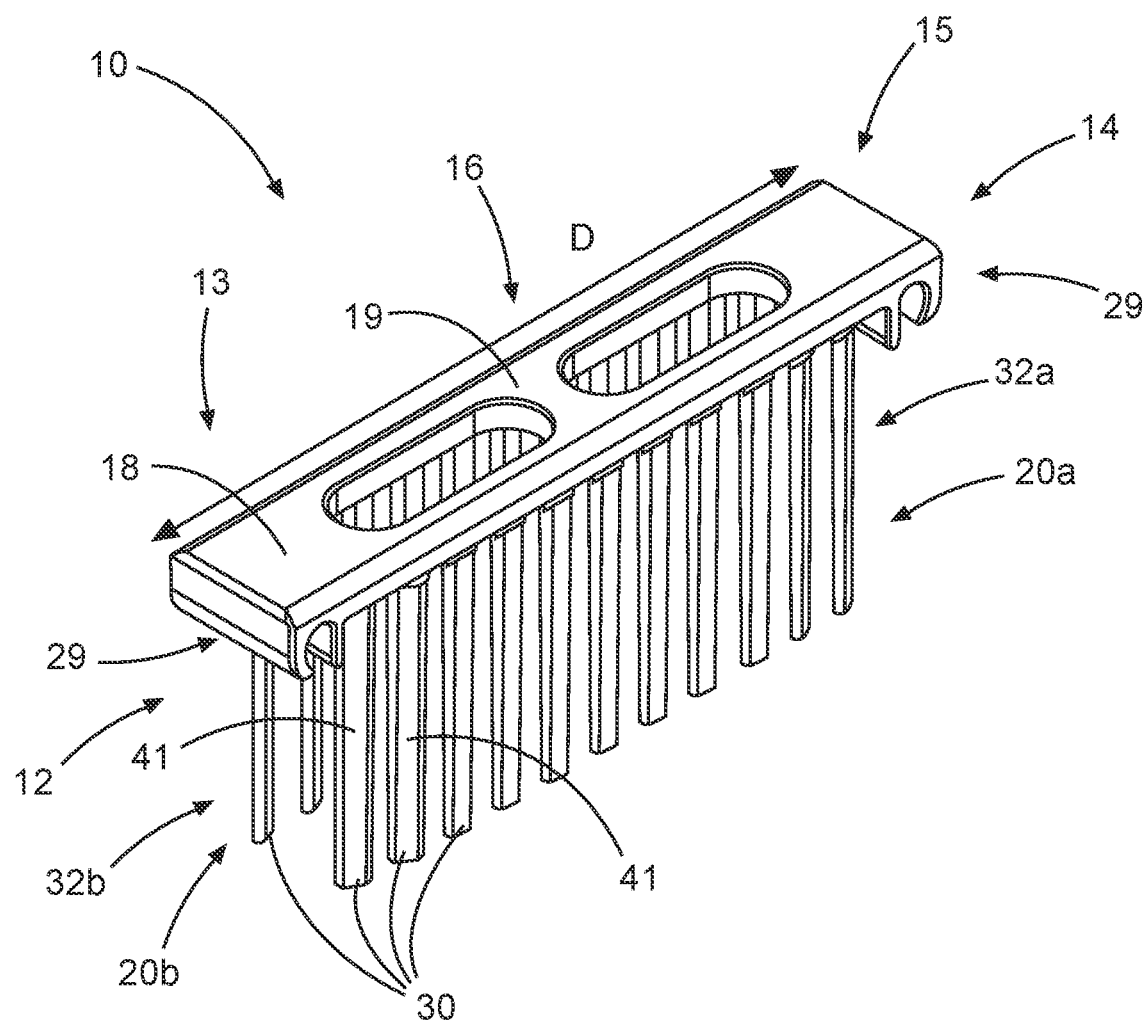
FIG. 1: is a perspective view of a clip line fixture according to the present invention.

FIG. 1 shows a perspective view of a clip line fixture 10 comprising a first attachment portion 12 provided at a first side portion 13 of clip line fixture 10, and a second attachment portion 14 provided at a second side portion 15 of clip line fixture 10, opposite first side portion 13. Clip line fixture 10 further comprises a hold-down portion 16 arranged between the first and second attachment portions 12, 14. First and second attachment portions 12, 14 and hold-down portion 16 are connected through base portion 18.

Clip line fixture 10 can be made of any material. It is particularly preferred that fixture 10 is made of a plastic, preferably a thermoplastic. However, it is also possible that fixture 10 is made of a composite material, i.e. a material of different plastics or plastics combined with other materials such as metals and the like.

Figure 2A:
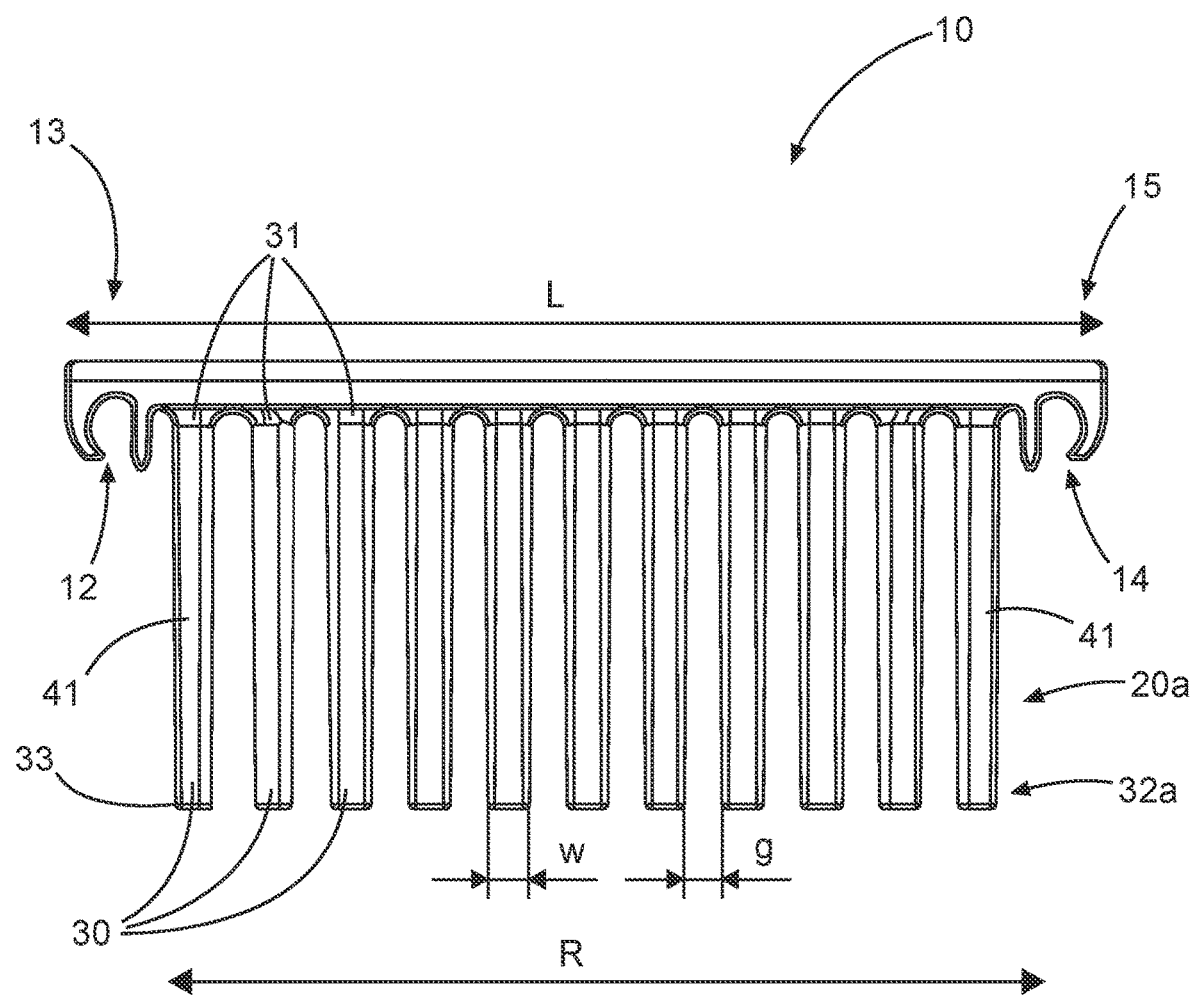
FIG. 2a: is a full frontal view of the clip line fixture depicted in FIG. 1.
Figure 2B:
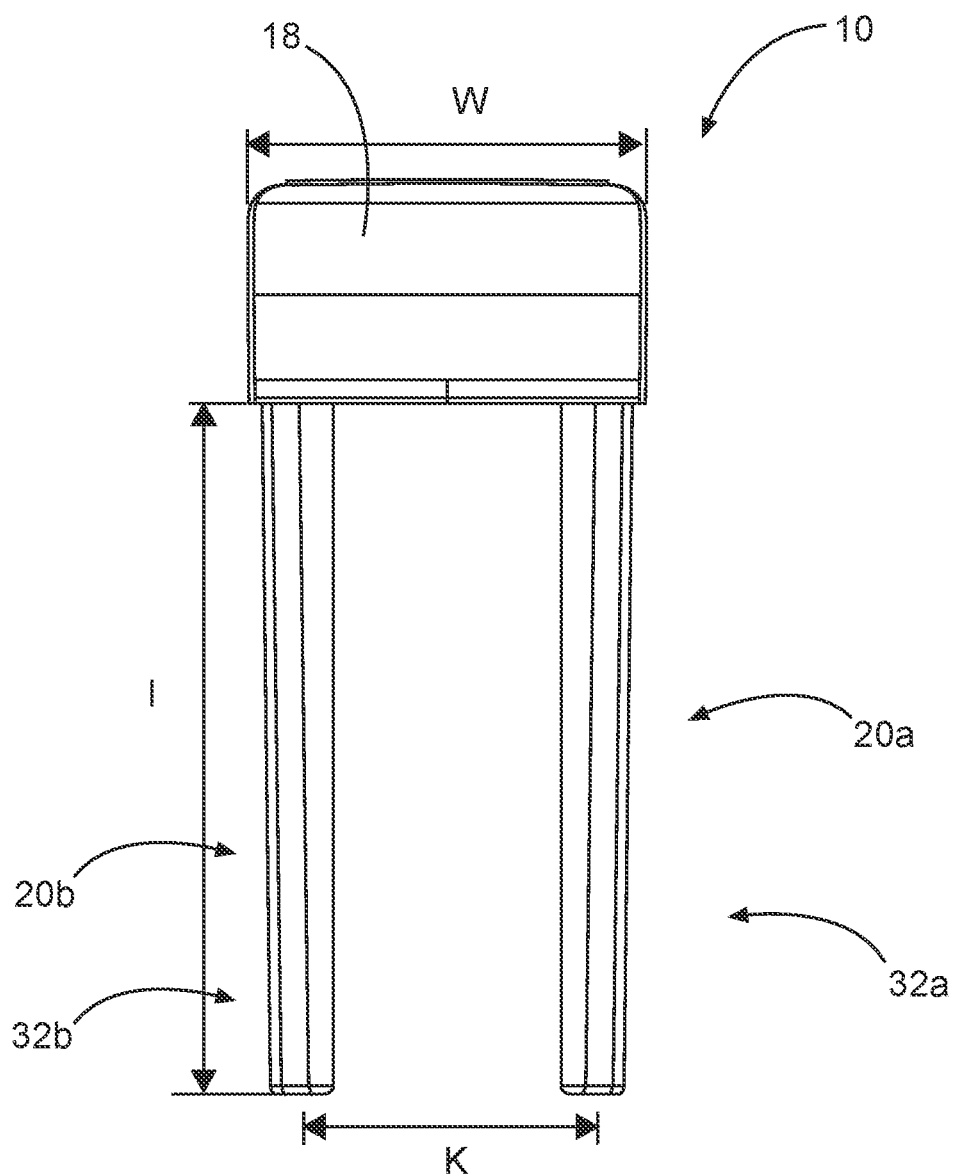
FIG. 2b: is a side view of the clip line fixture depicted in FIG. 1.
Figure 2D:
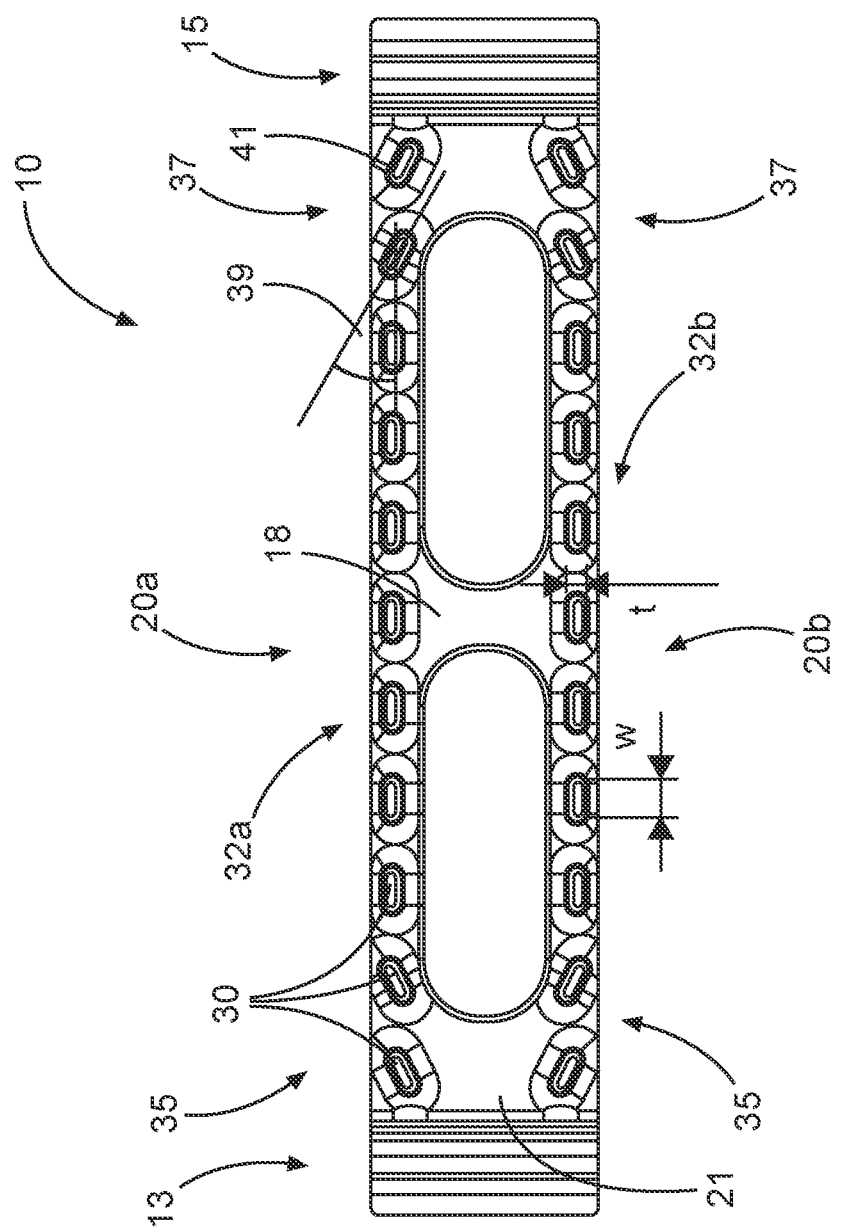
FIG. 2d: is a bottom view of the clip line fixture depicted in FIG. 1.

FIG. 2a provides a frontal view of clip line fixture 10, FIG. 2b provides a side view of a clip line fixture 10, FIG. 2c provides a top view of a clip line fixture 10 and FIG. 2d provides a bottom view of clip line fixture 10. As will be described in more detail below in conjunction with embodiments of a clip reel CR depicted in FIGS. 6 through 10c, each of the first and second attachment portions 12, 14 is shaped to removably attach clip line fixture 10 to a clip reel shown in FIGS. 6 to 10c. Hold-down portion 16 is shaped to engage a clip line wound around a clip reel, a detailed description of which will be provided below inter alia in conjunction with embodiments of a clip line CL depicted in FIGS. 9a through 10c.

Hold-down portion 16 comprises, a first flexible engagement portion 20a and a second flexible engagement portion 20b, each of the first and second flexible engagement portions 20a, 20b extending from a bottom face 21 of and away from base portion 18. In the depicted embodiment, base portion 18 is formed as a substantially bar-like member 19, which has cross-sectional dimensions which are much smaller than a lengthwise dimension, with the lengthwise dimension of base portion 18 extending between first side portion 13 and second side portion 15. As will be further described below, base portion 18 acts as a bridging member configured to provide a bridging distance D defined between first attachment portion 12 and second attachment portion 14 for bridging a separation between a first and a second mating portion of a clip reel. In an undeflected state of clip line fixture 10, for example depicted in FIGS. 1 through 2d, bridging distance D corresponds to a lengthwise dimension L of base member 18.

Each of first flexible engagement portion 20a and second flexible engagement portion 20b comprises a plurality of elongate flexible engagement elements 30. Each flexible engagement element 30 comprises a fixed end 31 attached to bottom face 21 of base portion 18, and a free end 33 opposite first end 31. Moreover, each flexible engagement element 30 is configured such that free end 33 is deflectable. As depicted inter alia in FIG. 2d, each of flexible engagement elements 30 comprises a cross-section having a major dimension or width w, and a minor dimension or thickness t. Consequently, the bending stiffness of each flexible engagement element 30 in a direction perpendicular to its width w is smaller than a bending stiffness in a direction perpendicular to its thickness t. Thus, when subject to external forces and/or bending moments, flexible engagement elements 30 are more easily bendable in a direction perpendicular to their width w. In other words, a deflection of free end 33 of flexible engagement element 30 is more easily induced in a direction perpendicular to its width w.

The plurality of flexible engagement elements 30 of each of first flexible engagement portion 20a and second flexible engagement portion 20b form two parallel rows 32a, 32b of flexible engagement elements 30. In particular, flexible engagement elements 30 of first flexible engagement portion 20a form a first row 32a, and flexible engagement elements 30 of second flexible engagement portion 20b form a second row 32b. Rows 32a, 32b are each aligned with lengthwise dimension L of base portion 18 and separated from one another at a distance K, cf. e.g. FIG. 2b. In particularly preferred embodiments, the distance K between parallel extending rows 32a, 32b is adapted to a distance between two troughs of a clip line to be secured by clip line fixture 10.

Each of rows 32a, 32b of the depicted embodiment forms a comb-like pattern, wherein along row orientation direction R of rows 32, 32b adjacent elongate flexible engagement elements 30 of a respective row are separated by a respective gap width g (cf. FIG. 2a). In particularly preferred embodiments, the gap width g is constant in each of rows 32a, 32b, more preferably gap width g is constant over both rows 32a, 32b. Alternatively or additionally, a gap width g is adapted to a width of a clip line to be secured by clip line fixture 10. Alternatively or additionally, gap width g and width w of elongate flexible engagement element 30 are identical in size. Alternatively or additionally, the sum of gap width g and width w substantially equals to a width of a clip line to be secured by clip line fixture 10. In further preferred or alternative embodiments, width w is smaller than or larger than gap width g.

In the depicted embodiment, a majority of flexible engagement elements 30 is arranged such that width w of their cross-section is aligned with a lengthwise dimension L of base member 18. Each of first flexible engagement portion 20a and second flexible engagement portion 20b comprise a first subset 35 of flexible engagement elements 30, and a second subset 37 of flexible engagement elements 30. First subset 35 corresponds to a subset of flexible engagement elements 30 of each flexible engagement portion 20a, 20b located at or near first side portion 13, likewise second subset 37 corresponds to a subset of flexible engagement elements 30 of each flexible engagement portion 20a, 20b located at or near second side portion 15. As exemplified in FIG. 2d with a representative flexible engagement element 30 of second subset 37 of first flexible engagement portion 20a, flexible engagement elements 30 of second subset 37 are rotated compared to the majority of flexible engagement elements 30, such that their width w is inclined at an angle 39 with respect to lengthwise dimension L of base member 18. Preferably, angle 39 is 15° or larger, 20° or larger, 25° or larger, 30° or larger, 35° or larger, or 40° or larger.

In the depicted embodiment, the rotation of first and second subsets 35, 37 follows the symmetries of base portion 18 and will be exemplified with reference to outer faces 41 of elongate flexible engagement elements. An outer face 41 of an elongate flexible engagement element 30 corresponds to a face defined by length l and width w of the individual elongate flexible engagement element 30 of the first or second flexible engagement portion 20a, 20b which faces away from the respective other of the first or second flexible engagement portion 20a, 20b. The rotation of elongate flexible engagement elements 30 in first and second subsets 35, 37 is such that their outer faces 41 are oriented toward the respective first and second side portions 13, 15.

First and second subsets 35, 37 of the depicted embodiment each comprise two rotated elongate flexible engagement elements 30. In alternative embodiments, each subset comprises at least one, at least two, at least three, at least four and/or more rotated elongate flexible engagement elements 30.

As, for example, depicted in FIG. 2c, base portion 18 comprises a first flexible portion 40, a second flexible portion 42 and a stiffening portion 44 provided between first flexible portion 40 and second flexible portion 42. In the embodiment, first flexible portion 40 and second flexible portion 42 are provided by a first recess 46 in base member 18 and a second recess 48 in base member 18, respectively. Recesses 46, 48 consecutively extend along portions of lengthwise dimension L of base member 18 and effectively separate bar-like member 19 forming base portion 18 in two parallel sub bars 19a, 19b. In a direction of lengthwise dimension L, recesses 46, 48 are separated by connection portion 50 which connects sub bars 19a, 19b and thereby forms stiffening portion 44. It is also possible that first flexible portion 40 and/or second flexible portion 42 is made of a material that is more elastic than stiffening portion 44. The different elastic properties of first flexible portion 40 and/or second flexible portion 42 compared to stiffening portion 44 can allow clip line fixture 10 to deform in the longitudinal direction, for example to allow fixture 10 to deform to compensate for different distances between the side wall of a clip reel and/or to obtain an elastic force to assist the attachment of attachment portions 12, 14.

Figure 3:
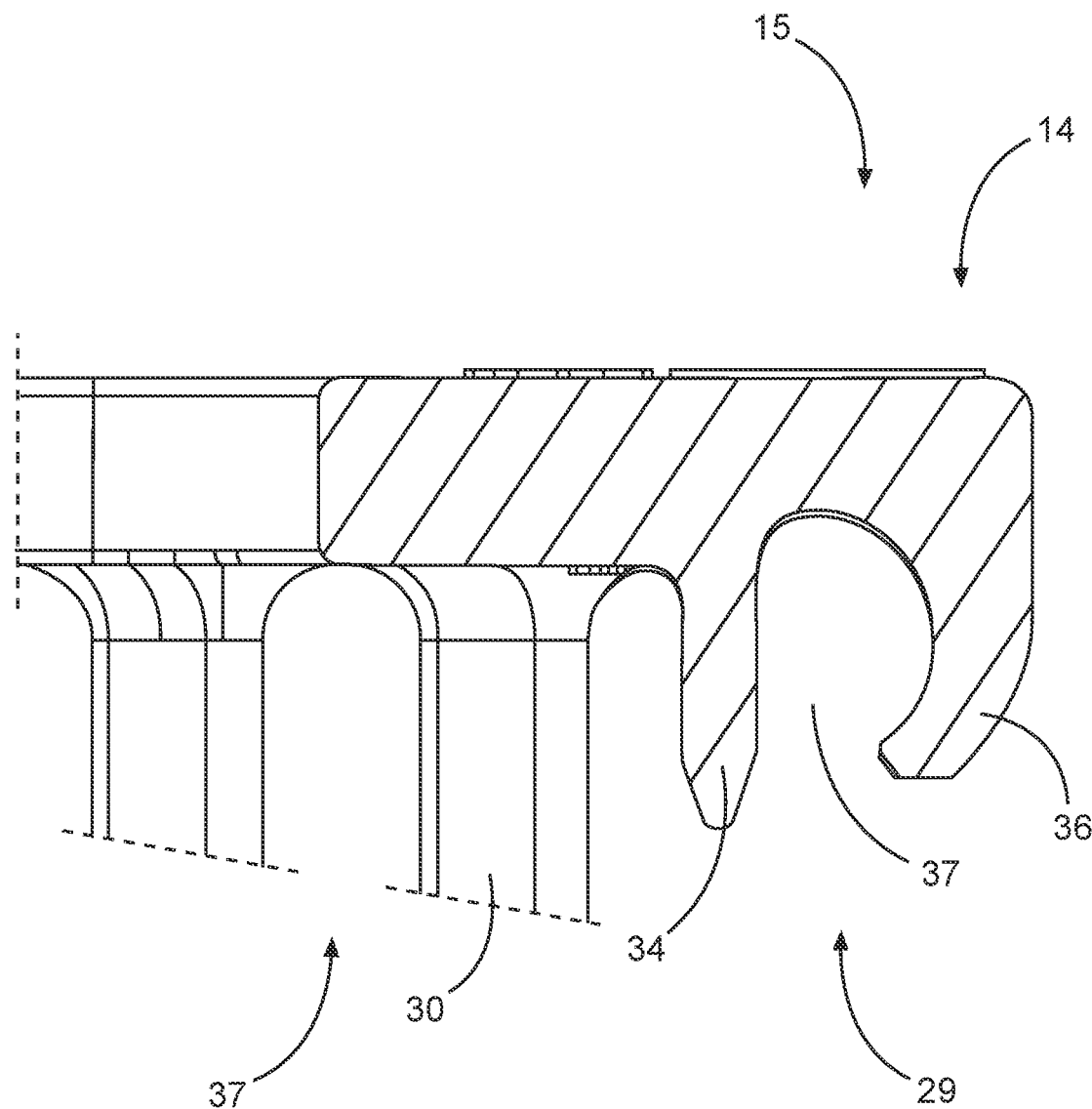
FIG. 3: is an enlarged detail of a cut through the clip line fixture along line A-A shown in FIG. 2c.

FIG. 3 is a detail view of a clamp segment 29 provided by second attachment portion 14 in a cut through clip line fixture 10 along line A-A indicated in FIG. 2c. First attachment portion 12 can have an identically equipped clamping segment 29. However, it is also possible to design the clamp segment of first attachment portion 12 differently. In other words, the invention allows the clamp sections of first or second attachment portion 12, 14 to have different configurations.

Clamp segment 29 is configured to releasably mate with a corresponding mating portion of a clip reel through form closure or positive locking, respectively, and/or traction closure or force locking, respectively. In the following, clamp segment 29 of second attachment portion 14 is described. It has to be understood however, and as stated above and clearly seen in the appended figures, that first attachment portion 12 comprises a corresponding clamp segment 29. In the depicted embodiment, clamp segment 29 comprises an inner clamping arm 34 and an outer clamping arm 36, both of which extend from a lower portion of side portion 15. Inner clamping arm 34 and outer clamping arm 36 enclose a receiving space 37. Together, inner clamping arm 34, outer clamping arm 36 and receiving space 37 are shaped to engage a correspondingly shaped mating portion of a clip reel, as will be described in greater detail below in conjunction with clip reel CR depicted in FIGS. 6 through 10c, to releasably attach clip line fixture 10 to the clip reel.

In the depicted embodiment, inner clamping arm 34, i.e. the clamping arm located adjacent the two outermost flexible engagement elements 30 of subsets 37 of respective first and second flexible engagement portions 20a, 20b, extends substantially straight and perpendicular to lower face 21 of base portion 18 and in parallel with flexible engagement elements 30. Outer clamping arm 36 also extends away from lower face 21, but is curved or angled toward inner arm 34.

Figure 4:
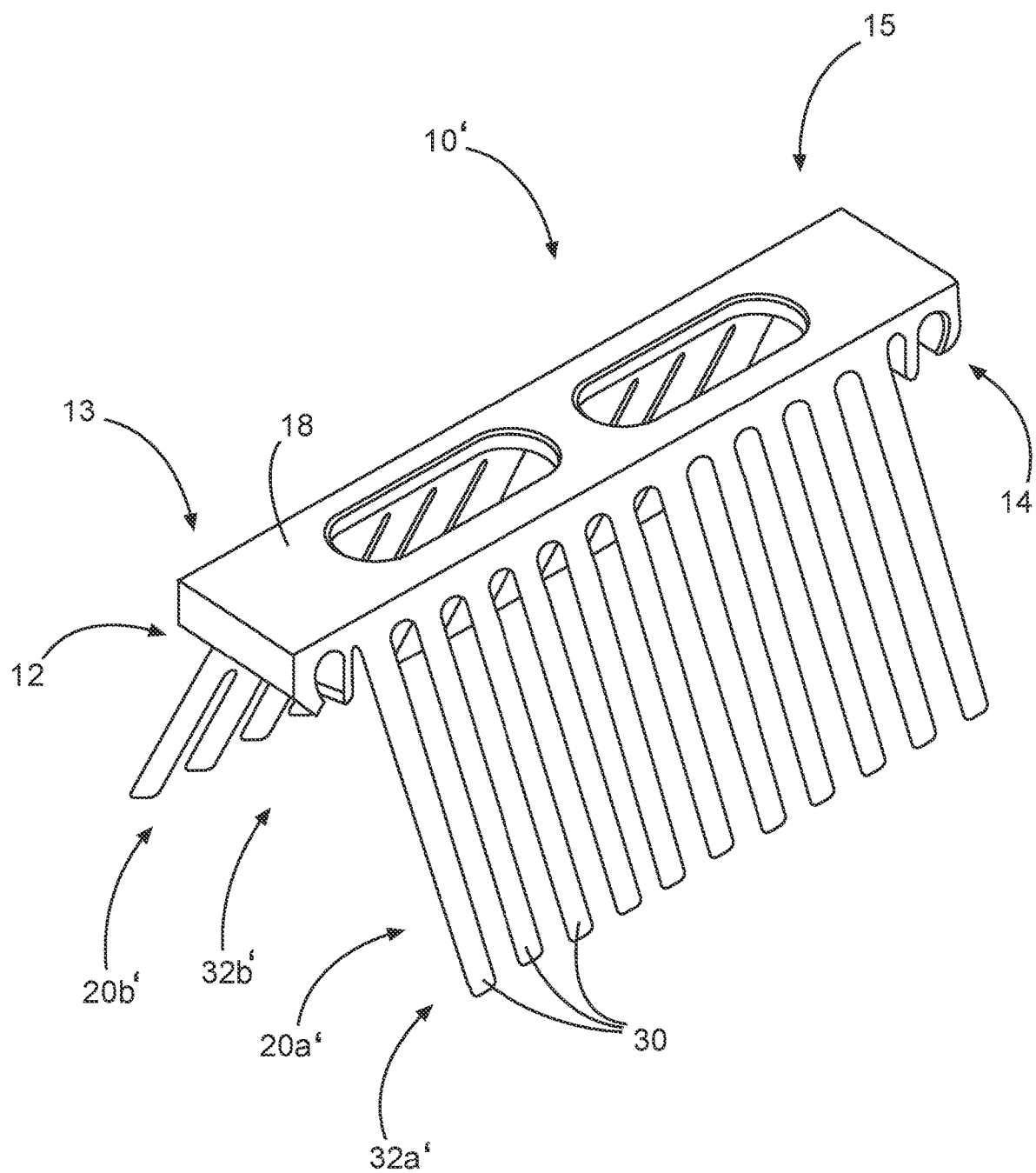
FIG. 4: is a perspective view of another embodiment of a clip line fixture according to the present invention.
Figure 5A:
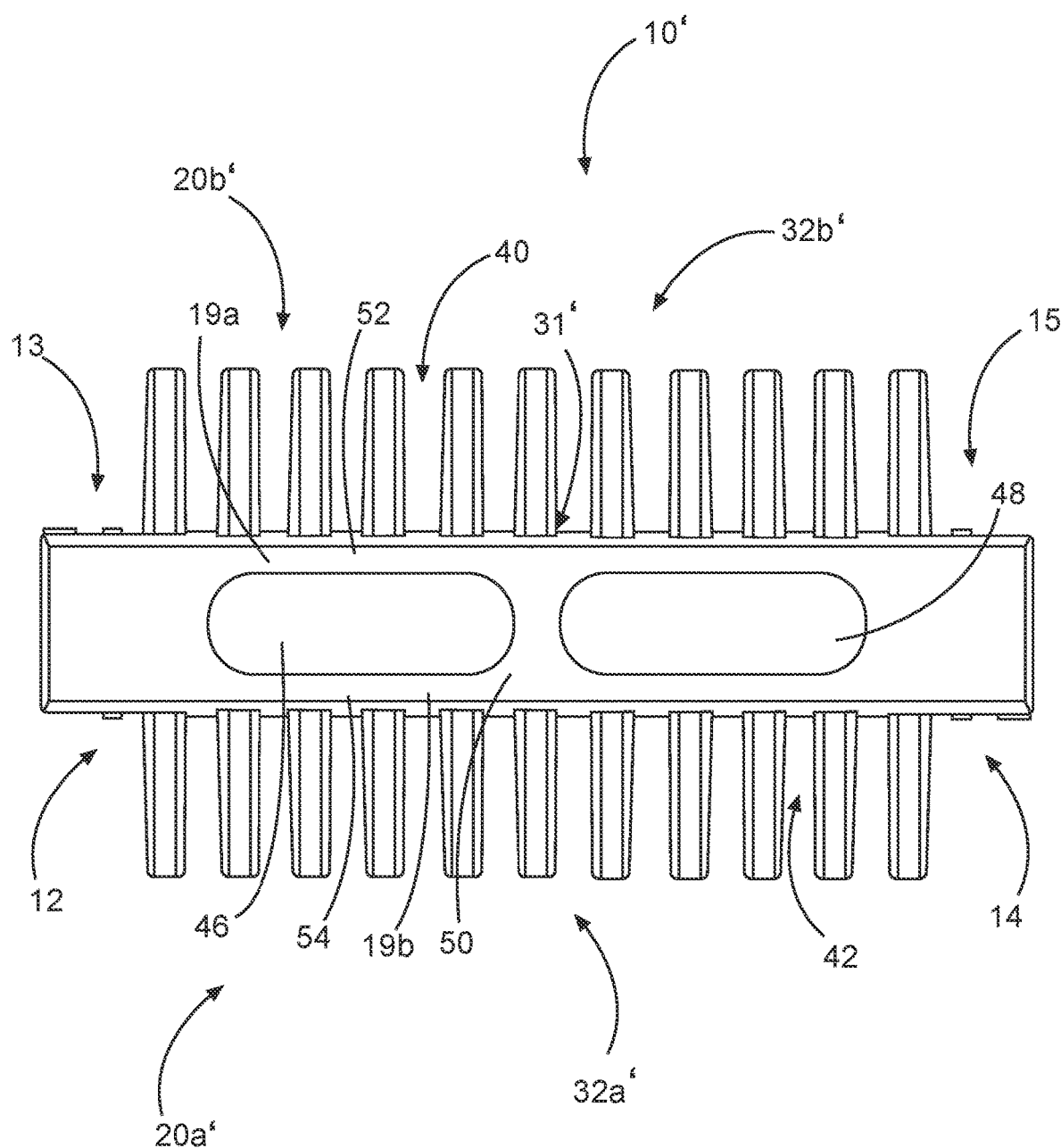
FIG. 5a: is a top view of the clip line fixture depicted in FIG. 4.
Figure 5B:
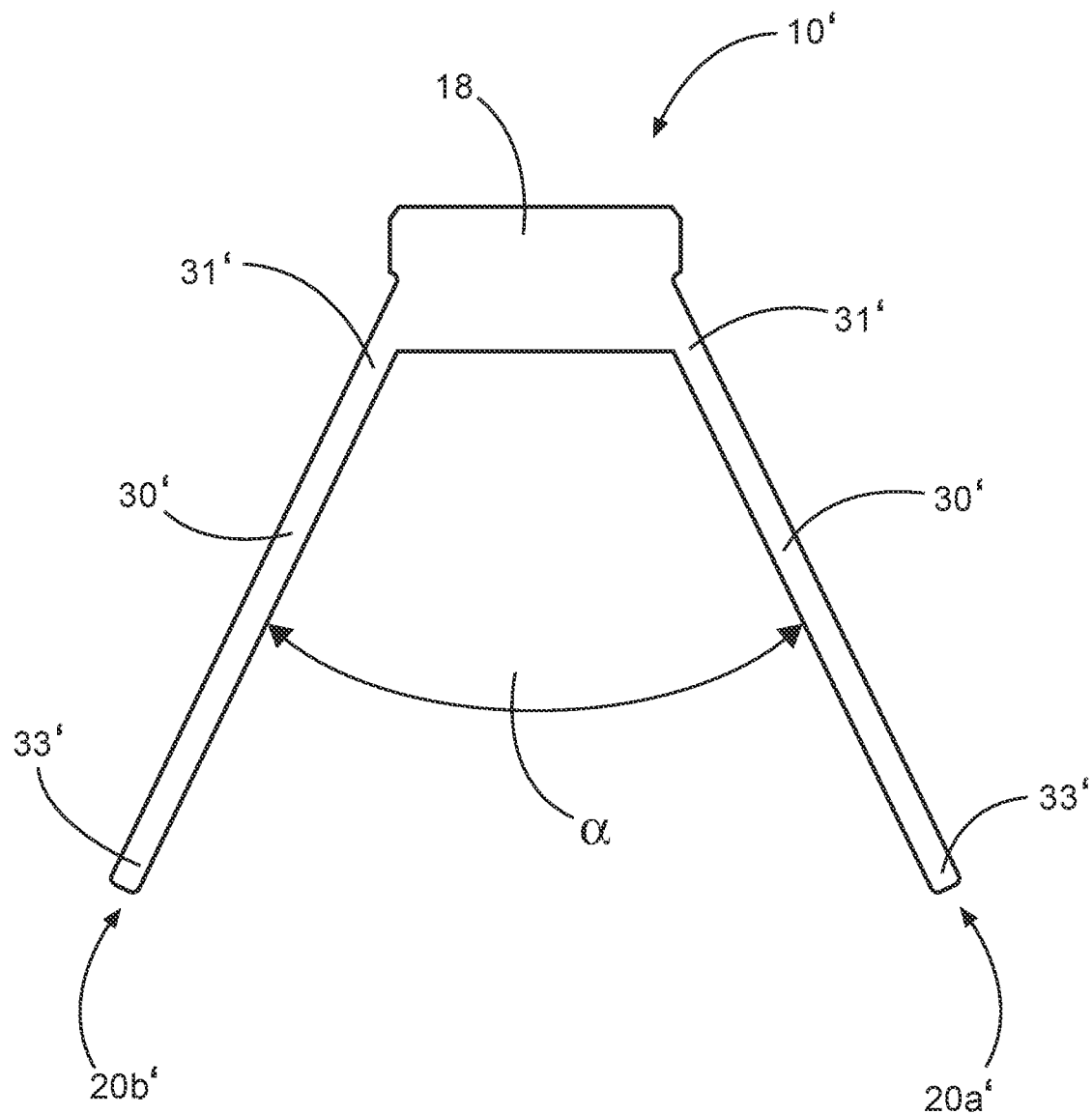
FIG. 5b: is a side view of the clip line fixture depicted in FIG. 4.

FIG. 4 shows another embodiment of a clip line fixture 10' which is similar to clip line fixture 10 of FIGS. 1 to 3. FIG. 5a provides a top view of clip line fixture 10' and FIG. 5b a respective side view thereof. The difference between the embodiments of clip line fixture 10 and clip line fixture 10' lies in that first flexible engagement portion 20a' and second flexible engagement portion 20b' extend from lower face 21 of base member 18 in different directions, i.e. not in parallel. As indicated in FIG. 5b, first flexible engagement portion 20a' and second flexible engagement portion 20b' extend away from lower face 21 and away from each other, thereby enclosing an angle α therebetween. It has to be understood, and as clearly visible from FIGS. 4 through 5b, that the remaining features of clip line fixture 10' are identical to those of clip line fixture 10. Therefore, it is referred to the foregoing sections relating to clip line fixture 10 and a detailed description of clip line fixture 10' is omitted.

Figure 6:
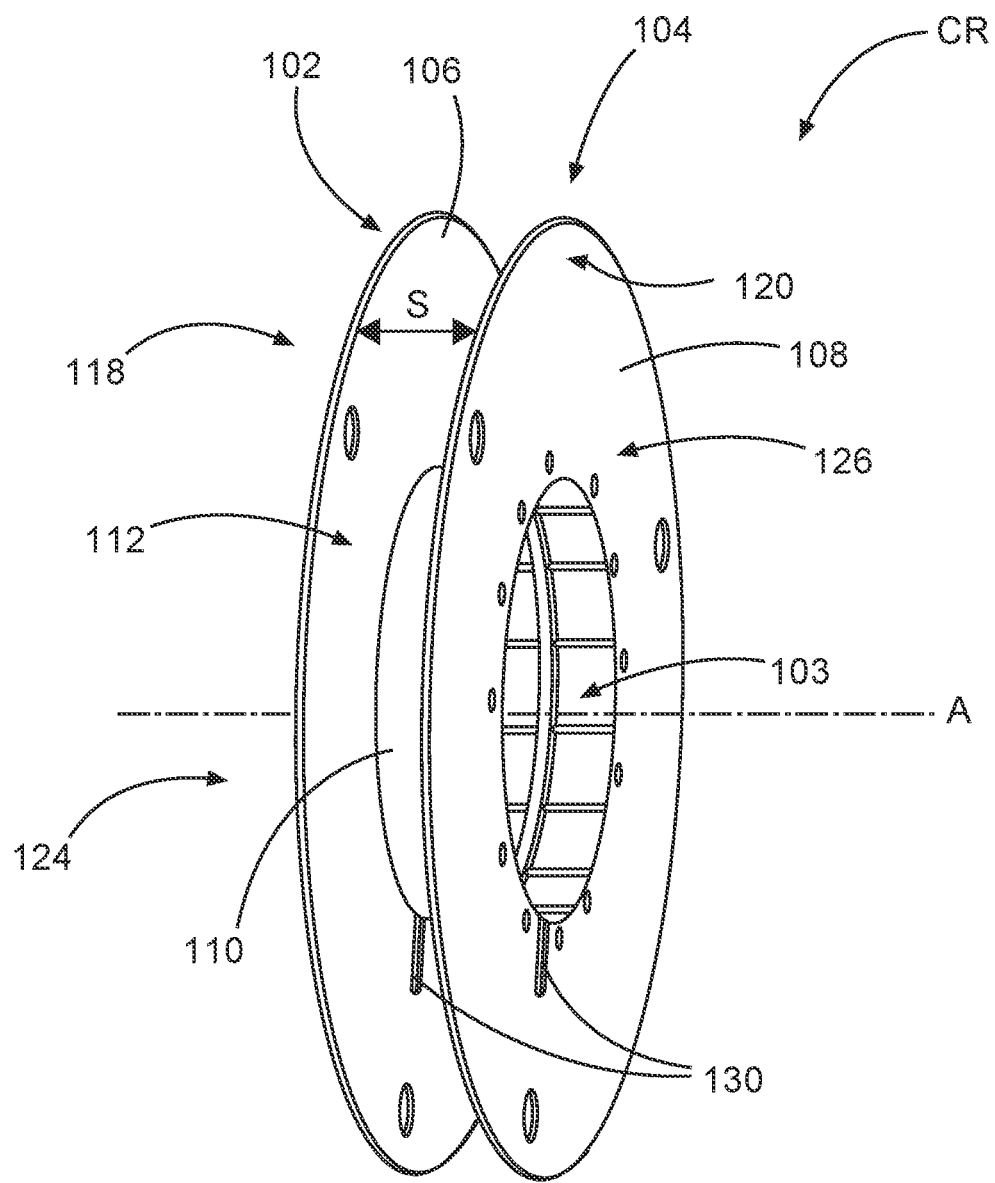
FIG. 6: is a perspective view of a clip reel according to the present invention.
Figure 7A:
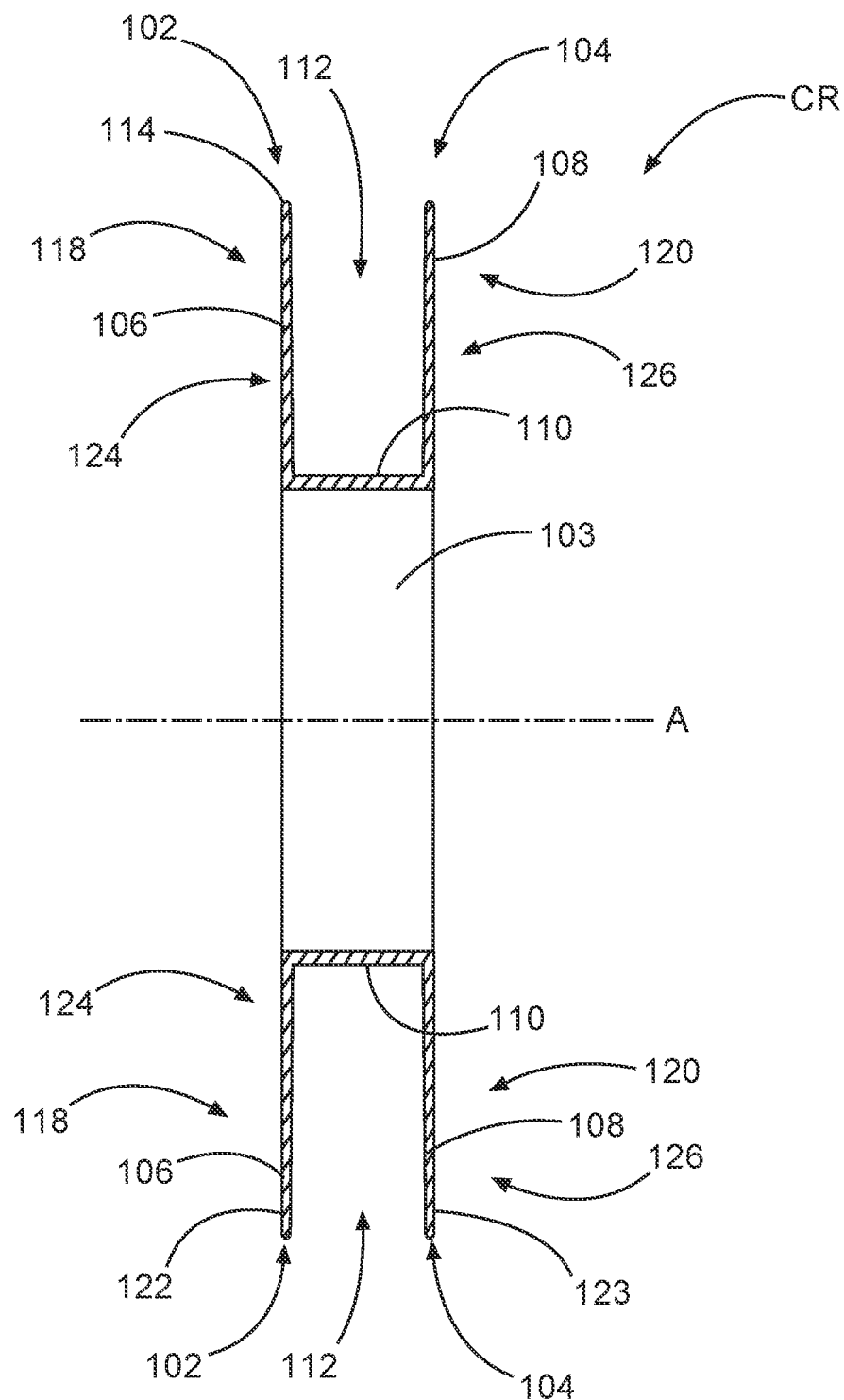
FIG. 7a: is a cut through the clip reel of FIG. 6.
Figure 7B:
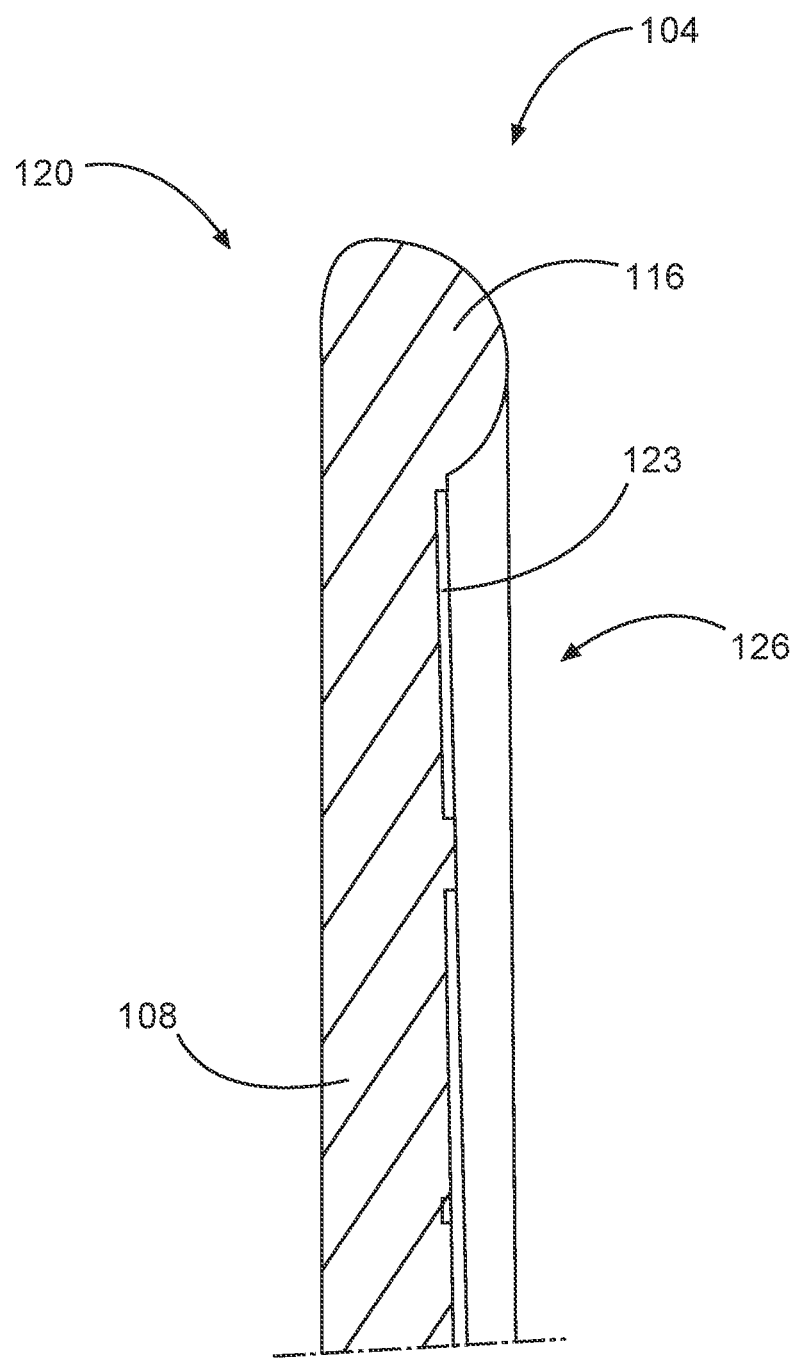
Figure 7C:
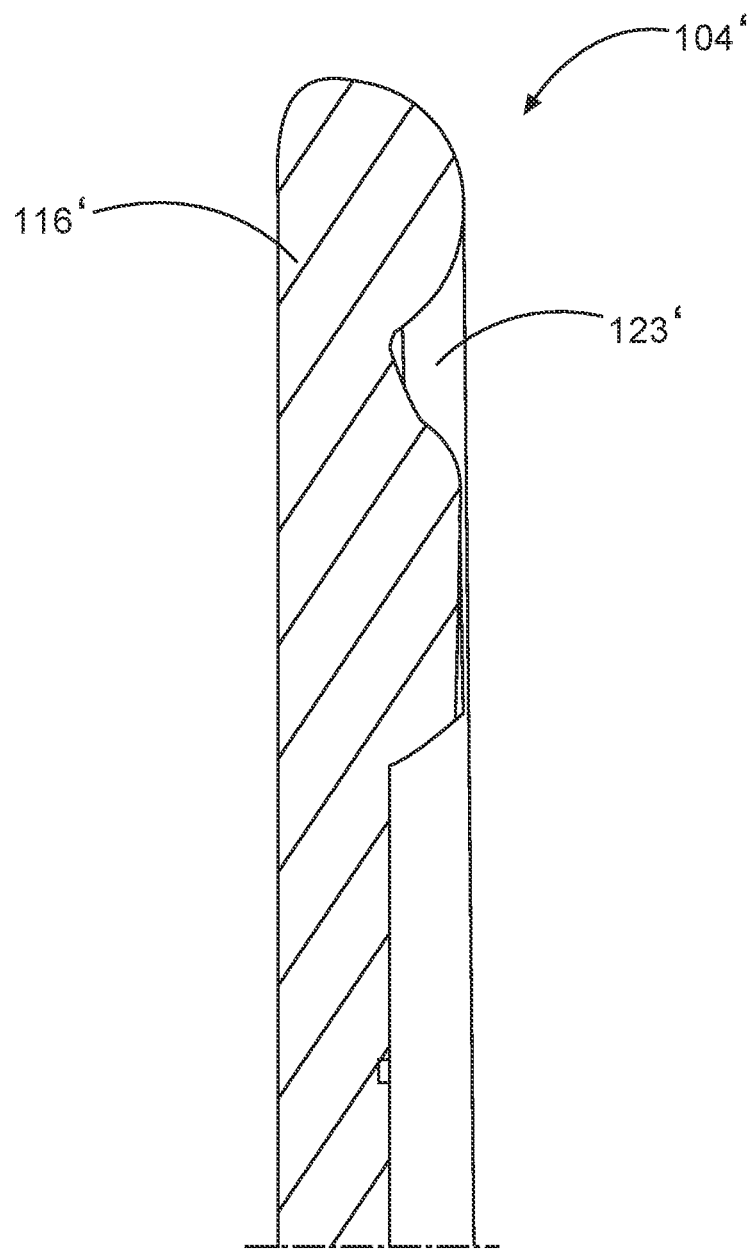
FIG. 7c: is an enlarged detail similar to FIG. 7b of another embodiment of a clip reel according to the present invention.

Now turning to FIGS. 6 through 7c, clip reel CR is described. The depicted embodiment of clip reel CR is in many ways similar to clip reels known in the art such as those described in above referenced EP 1 567 418 A1. Thus, clip reel CR comprises a hub portion defining central axis A, a first side wall 106 extending radially outward from an outer circumferential surface 110 of hub portion 103, and a corresponding second sidewall 108 extending radially outward from outer circumferential surface 110 of hub portion 103. First sidewall 106 and second sidewall 108 are axially spaced at a separation S, thereby defining a clip line winding space 112 in a volume enclosed by first sidewall 106 and second sidewall 108. In other words, clip line space 112 forms an annular channel extending in a circumferential direction around outer circumferential surface 110. FIG. 7a is a cut view through clip reel CR of FIG. 6 in a plane of central axis A.

First sidewall 106 provides a first mating portion 102 and second sidewall 108 provides a second mating portion 104. Each of mating portions 102, 104 is shaped to be engaged by correspondingly shaped attachment portions 12, 14 of clip line fixture 10, 10' to releasably attach clip line fixture 10, 10' to clip reel CR.

Figure 8:
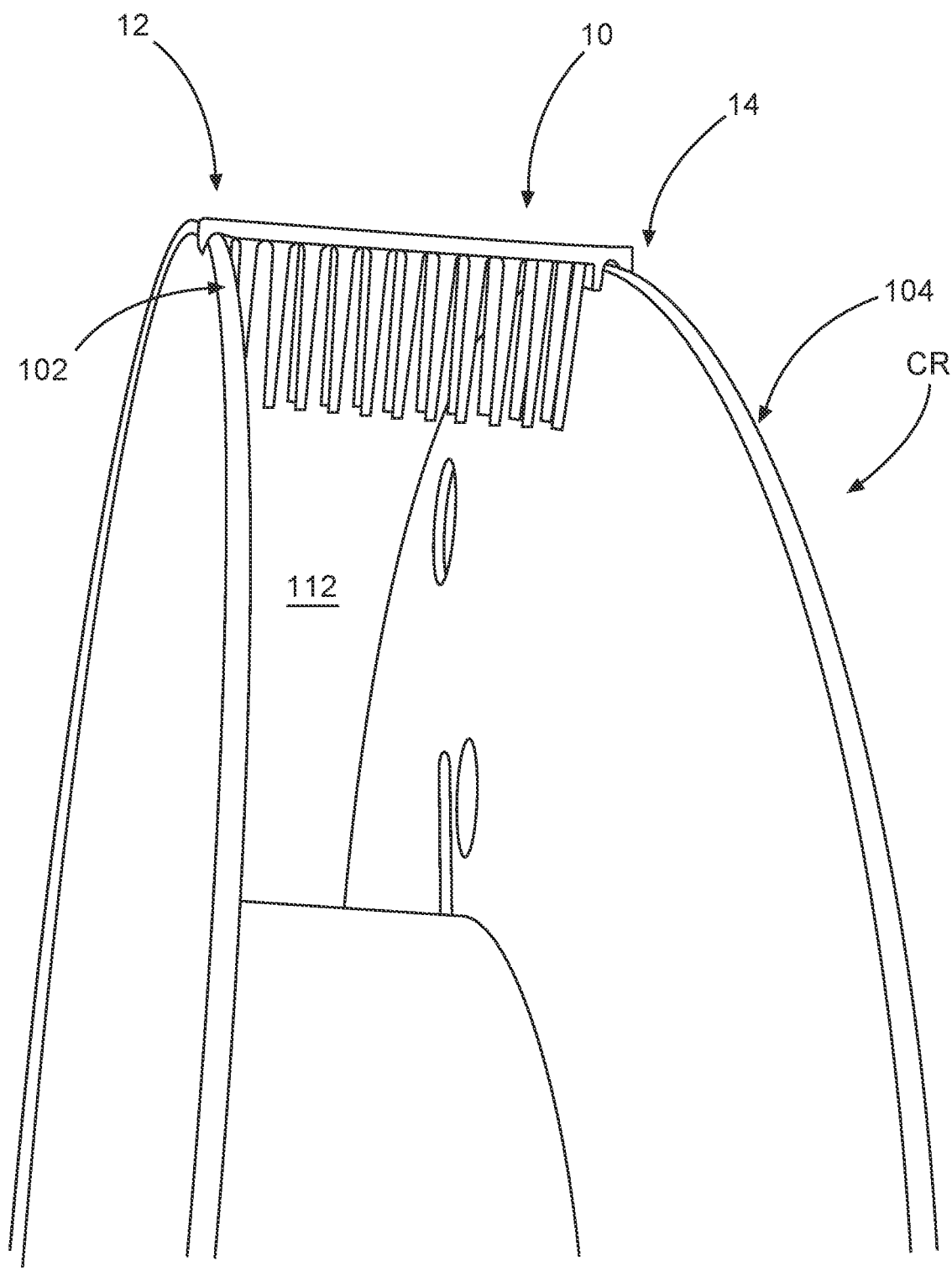
FIG. 8: is a perspective view of an embodiment of a clip line fixture according to the present invention attached to an embodiment of a clip reel according to the present invention.

Engagement between attachment portion 12, 14 and mating portions 102, 104 is demonstrated inter alia in FIG. 8, which shows an assembly of clip line fixture 10 attached to clip reel CR.

FIG. 7b provides a detailed view of a cut through second mating portion 104 for exemplifying the design of both first mating portion 102 and second mating portion 104. Mating portions 102, 104 each comprise a respective bulge 114, 116, which extends around a respective outer rim portion 118, 120 of first side wall 106 and second side wall 108. Bulges 114, 116 are defined by a circumferentially extending portion on respective outer rim 118, 120 forming an annular protrusion extending outward from outer faces 124, 126 of respective first and second side wall 106, 108 parallel to axial direction A.

Each of first and second mating portion 102, 104 further comprise a respective circumferentially extending locking groove 122, 123 provided in respective first and second side wall 106, 108. In the depicted embodiment, respective locking grooves 122, 123 are formed by an annular recess in respective outer faces 124, 126 of respective first and second sidewall 106, 108. Bulges 114, 116 are shaped corresponding to receiving space 37 of clamping segments 29 of clip line fixture 10, 10'. Thereby, clamping segments 29 provide form closure when engaging respective bulges 106, 108, thus securing clip line fixture 10, 10' to clip reel CR as depicted inter alia in FIG. 8. Respective outer arms 36 of clamp segments 29 extend into and/or are in contact with a surface of looking groove 124, further enhancing form closure and preventing unintended separation of clip line fixture 10 from clip reel CR. Alternatively or additionally, outer clamping arms 36 can comprise sufficient flexibility to press against respective sidewalls 106, 108 when engaging locking grooves 122, 123, thereby providing traction closure.

A further embodiment of clip reel CR comprises first and second mating portions 102', 104' as exemplified by second mating portion 104' in FIG. 7c. Second mating portion 104' differs from mating portion 104 of the embodiment of FIG. 7b in that locking groove 123' is provided in bulge 116'.

Moreover, clip reel CR comprises a pair of clip line fixture holders 130, preferably with a respective holder 130 provided in each of first and second sidewalls 106, 108. Holder 130 is configured to releasably attach clip line fixture 10, 10' to clip reel CR at a position on outer faces 124, 126. Said attachment position thus allows unwinding of a clip line stored on clip reel CR while allowing to store clip line fixture 10, 10' attached to clip reel CR. A particular advantage of this configuration is that clip line fixture 10, 10' and clip reel CR may remain physically connected even during operation of a clipping machine fed by clip reel CR, thus potentially reducing the risk of losing or misplacing clip line fixture 10, 10'.

The present invention is particularly advantageous in that it allows to attach clip line fixture 10, 10' to corresponding mating portions 102, 102', 104, 104' of clip reel CR at any position along the circumferential direction thereof. In other words, the attachment position of clip line fixture 10, 10' is freely selectable. In particular, the attachment position does not depend on the particular configuration of a clip line on clip reel CR, as will be further detailed below in conjunction with FIGS. 9a through 10c.

Figure 9A:
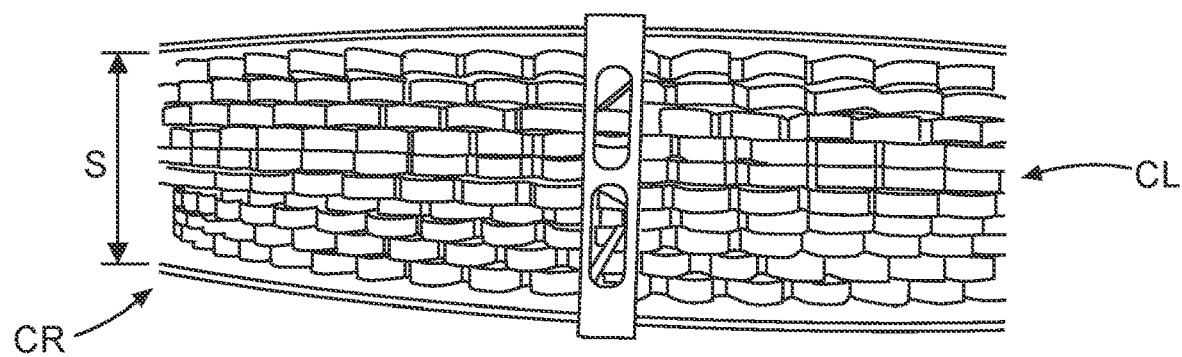
FIG. 9a-c: are different views of a clip reel assembly according to the present invention.
Figure 9B:
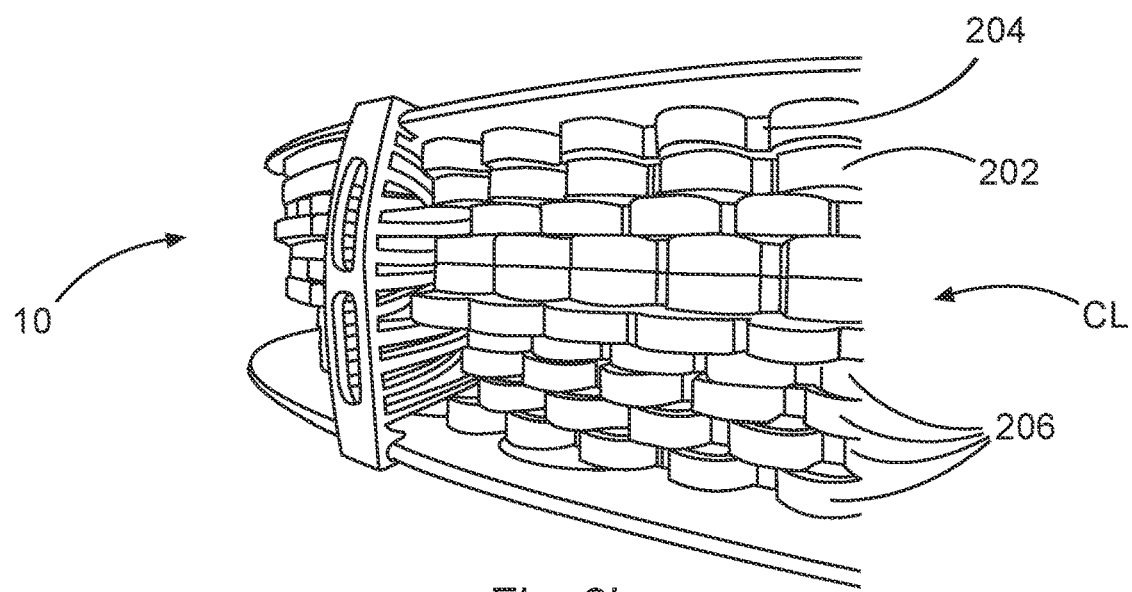
Figure 9C:
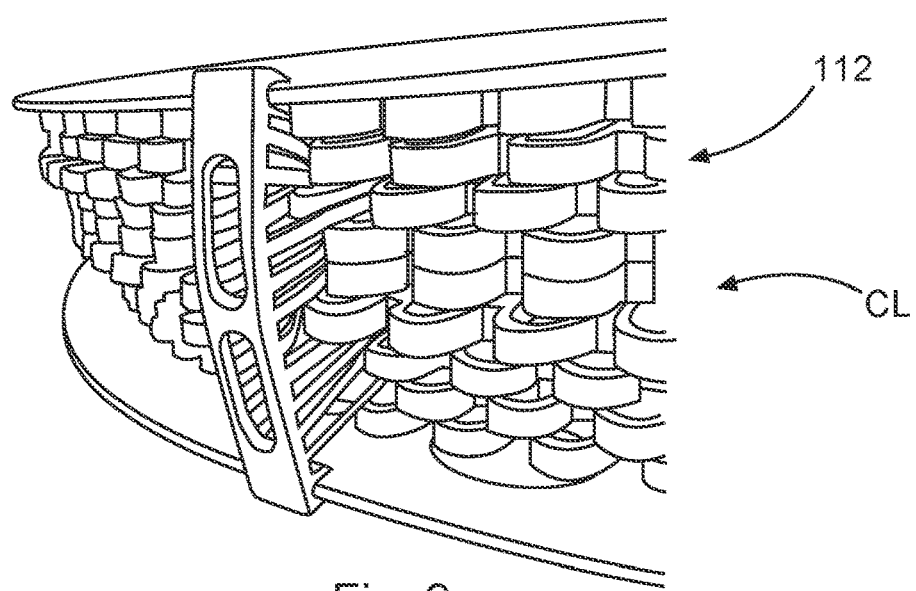

FIGS. 9a through 9c provide views on an assembly of clip reel CR and clip line fixture 10, wherein a clip line CL stored in clip line winding space 112 of clip reel CR is engaged and secured therein by clip line fixture 10. Clip line CL is formed from a metal wire and comprises an undulating pattern of alternating peaks 202 and troughs 204, and forms a plurality of windings 206 disposed in clip line winding space 112.

A plurality of advantages of the present invention become apparent from FIGS. 9a through 9c. Flexible engagement elements 30 of clip line fixture 10 extend into clip line winding space 112 from base portion 16 with free ends 33 extending into respective troughs 204 of clip line CL. By engaging clip line CL in this manner, clip line fixture 10 secures clip line CL against radially separating from clip reel CR, in particular against radially protruding from clip line winding space 112.

As clearly shown in the drawings, the flexibility of engagement elements 30 ensures that a free end 33 of each flexible engagement element 30 extends into a respective trough 204 of a corresponding winding 206 of clip line CL, in particular without the need for a precise alignment of clip line fixture 10 and troughs 204. When attaching clip line fixture 10 to clip reel CR, each free end 33, if not initially aligned with a corresponding trough 204, is guided into a respective trough 204 by engaging a portion of peak 202, leading to a deflection of perspective flexible engagement element 30 upon further advancement until clip line fixture 10 is fully attached to clip reel CR. Moreover, as described above, flexibility also helps to ensure that respective troughs 204 can be engaged by free ends 33, even if individual windings 206 are located at different heights within clip line winding space 112, i.e. at different radial distances from central axis A. This may particularly be advantageous when reattaching clip line fixtures 10, 10' to clip reel CR for securing a clip line CL of which a portion has already been consumed.

Adapting width w of engagement elements 30 and gap width g to a width of clip line CL, as depicted in FIGS. 9a through 10c, ensures that a majority or all of windings 206 are contacted by respective engagement element 30, in particular independent of the concrete design of clip line CL. The depicted design of clip line fixture 10, comprising two rows 32a, 32b of flexible engagement elements 30 advantageously enables to engage each winding 206 with two corresponding engagement elements 30, preferably two consecutive troughs 204 of a respective winding 206. Thereby, each winding 206 is secured against back-and-forth movement along the circumferential direction. It is particularly advantageous to adapt spacing K between first and second rows 32a, 32b to a distance between two consecutive troughs 204 of a clip line CL to be secured by clip line fixture 10.

Moreover, FIGS. 9a through 10c demonstrate the benefits of base portion 18 comprising flexible portions 40, 42. As depicted e.g. in FIG. 9a, separation S between first and second sidewalls 106, 108 is smaller than lengthwise extent L of base portion 18. However, as described above, flexibility of base portion 18 enables the depicted flexing thereof, so that clip line fixture 10 is attachable to clip reel CR even though lengthwise extent L is larger than separation S. In other words, flexing of base portion 18 brings attachment portions 12, 14 closer to one another, reducing bridging distance D sufficiently to enable bridging separation S. Connection portion 50 ensures that sub bars 19a, 19b do not buckle and/or flex significantly in a lateral and/or circumferential direction, thus maintaining spacing K between first and second rows 32a, 32b.

Flexible engagement elements 30 of subsets 35, 37, which are angled with respect to the majority of flexible engagement elements 30 as described above, thereby enable their respective free ends 33 to exhibit a deflection having a component directed to or away from respective adjacent side walls 106, 108, thus compensating for a reduced distance in between first and second attachment portions 12, 14. Such a compensation is particularly advantageous to help ensure that windings 206 in the vicinity of sidewalls 106, 108 are engaged by respective flexible engagement elements 30, even if base portion 18 is in a flexed state when attached to clip reel CR having a smaller separation S than base 18's lengthwise extent L.

Figure 10A:
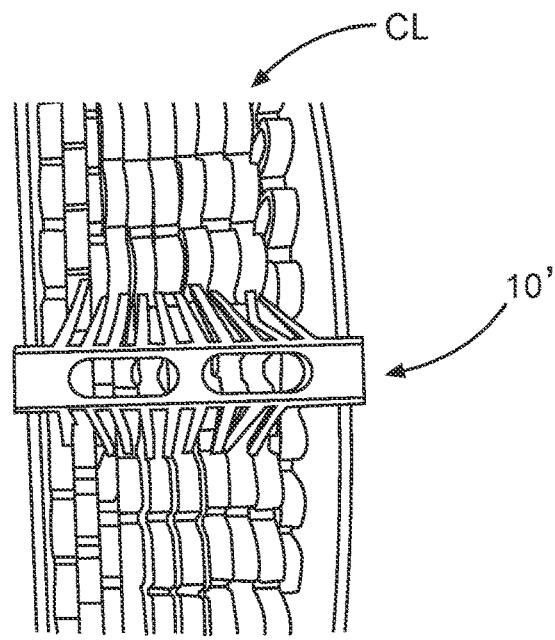
FIG. 10a-c: are different views of another embodiment of a clip reel assembly according to the present invention.
Figure 10B:
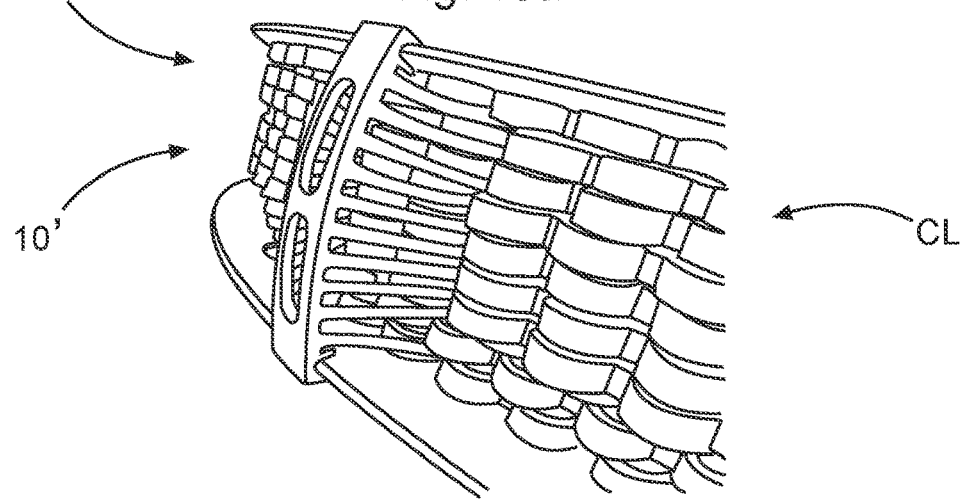
Figure 10C:
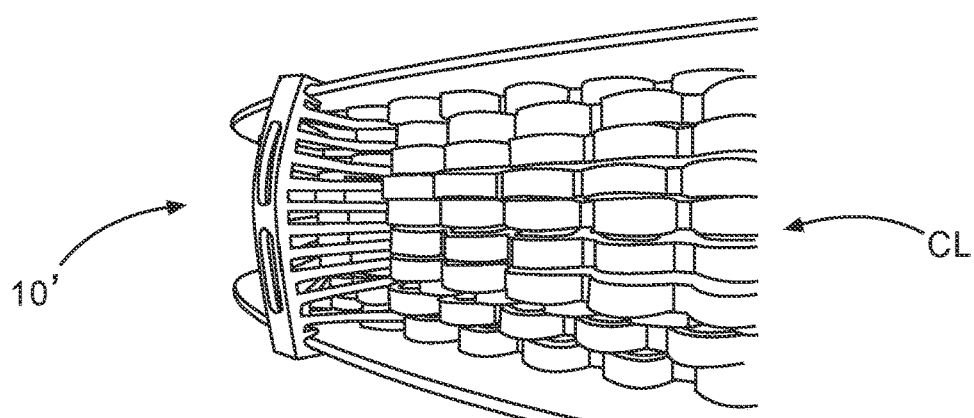

FIGS. 10a through 10c depict an assembly similar to that of FIGS. 9a through 9c, with clip line fixture 10' used to secure clip line CL to clip reel CR, exemplifying the benefits of angled flexible engagement portions 20a', 20b'. Angle α between portions 20a', 20b' helps to ensure that each winding 206 is engaged by two respective engagement elements 30 at different troughs 206. Moreover, as described above, design may reduce the overall stresses at base portions 31' of engagement elements 30' under bending, in particular by yielding a smaller resulting curvature than the parallel design of clip line fixture 10.

Figure 11:
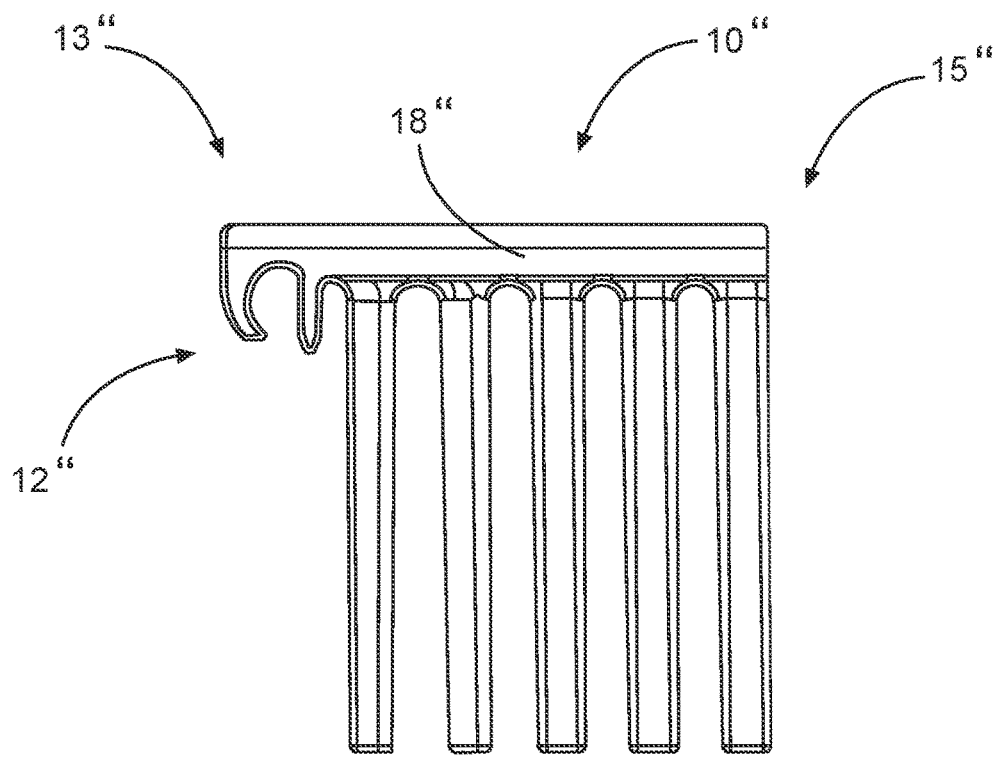
FIG. 11: is a frontal view of another embodiment of a clip line fixture according to the present invention.

FIG. 11 provides a frontal view of clip line fixture 10", which is similar to clip line fixtures 10, 10' depicted in FIGS. 1 through 10c. A particular difference between the previously described embodiments and clip line fixture 10" lies in that clip line fixture 10" comprises only a first attachment portion 12" at a first side portion 13" of clip line fixture 10". At second side portion 15" of clip line fixture 10", no further attachment portion is provided. First attachment portion 12" is configured to provide a sufficient clamping force to attach clip fixture 10" to a mating portion of a clip reel such as a selected one of mating portions 102, 104 or mating portions 102', 104'. The clamping force can be selected so that clip line fixture 10" can be attached to and removed from clip reel CR, but does not swivel as a result of the force exerted by the end of clip line CL on fixture 10". Aside from lacking a second attachment portion, clip line fixture 10" may comprise any or all of the features described herein in conjunction with other embodiments of the clip line fixture according to the first aspect, in particular any or all of the features depicted in and/or described in conjunction with FIGS. 1 through 10c.

Figure 12:
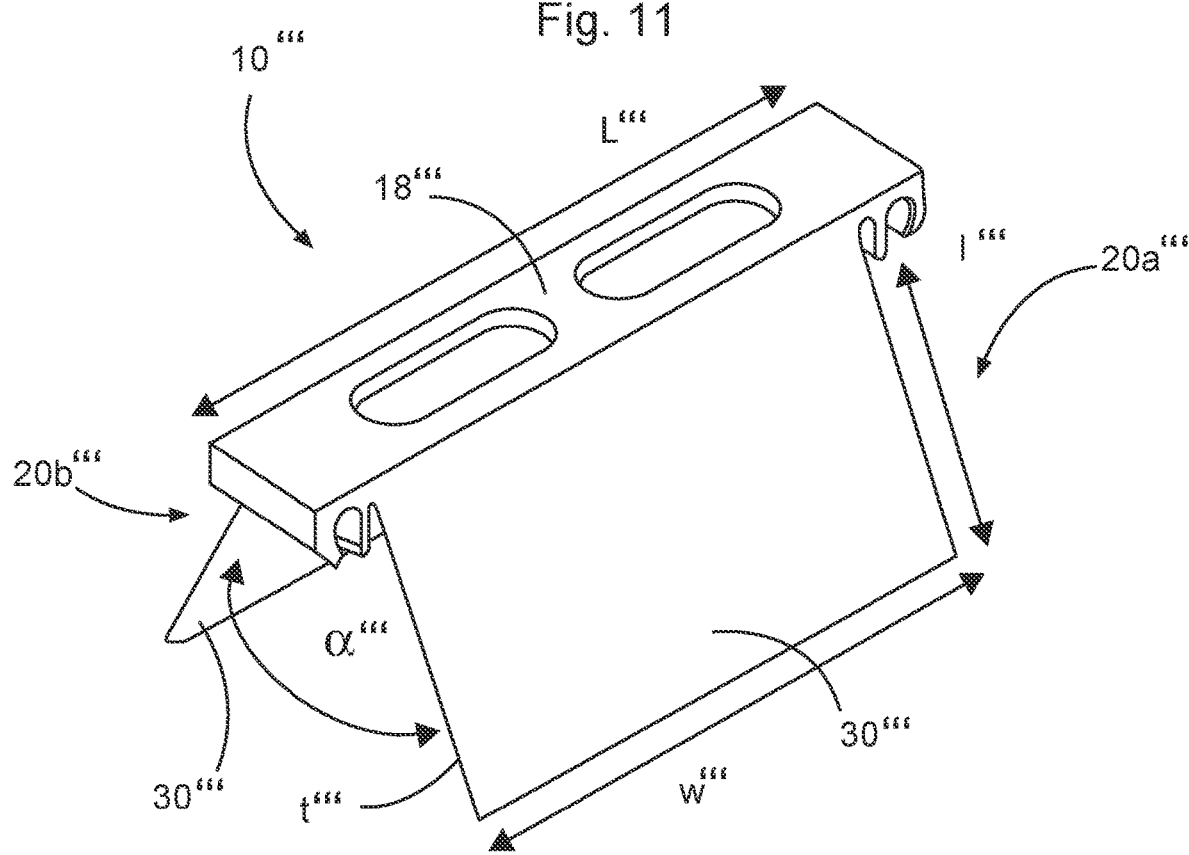
FIG. 12: is a perspective view of another embodiment of a clip line fixture according to the present invention.

FIG. 12 is a perspective view of clip line fixture 10''', which is similar to clip line fixtures 10, 10', 10" depicted in FIGS. 1 through 11. A particular difference between the previously described embodiments and clip line fixture 10''' lies in that clip line fixture 10''' comprises gapless first and second flexible engagement portions 20a''', 20b'''. In the depicted preferred embodiment, each of first and second flexible engagement portions 20a''', 20b''' comprises a single plate-like flexible engagement element 30''', i.e. its width w''' and length l''' is of similar magnitude and much larger than its thickness t'''. In the depicted embodiment, plate-like flexible engagement elements 30''' are provided such that a width w''' of each of plate-like flexible engagement elements 30''' extends in parallel with length L''' of base portion 18'''.

Similar to clip line fixture 10', plate-like flexible engagement elements 30''' of the depicted embodiment of clip line fixture 10''' extend from base portion 18''' and away from each other, thereby enclosing an angle α''' therebetween. It has to be understood, however, that similar to clip line fixture 10, plate-like flexible engagement elements 30''' may also extend in parallel with each other. Aside from gapless first and second flexible engagement portions 20a''', 20b''', clip line fixture 10''' may comprise any or all of the features described herein in conjunction with other embodiments of the clip line fixture according to the first aspect, in particular any or all of the features depicted in and/or described in conjunction with FIGS. 1 through 11.

In alternative embodiments of clip line fixture 10''', each of gapless first and second flexible engagement portions 20a''', 20b''' comprises a plurality of flexible engagement elements 30''' arranged such that adjacent flexible engagement elements 30''' are in contact with each other. It is particularly preferred that gapless first and second flexible engagement portions 20a''', 20b''' are each formed in the manner of a paint-brush, i.e. comprise a dense arrangement of a plurality of hair-like flexible engagement elements 30'''.

Figure 13A:
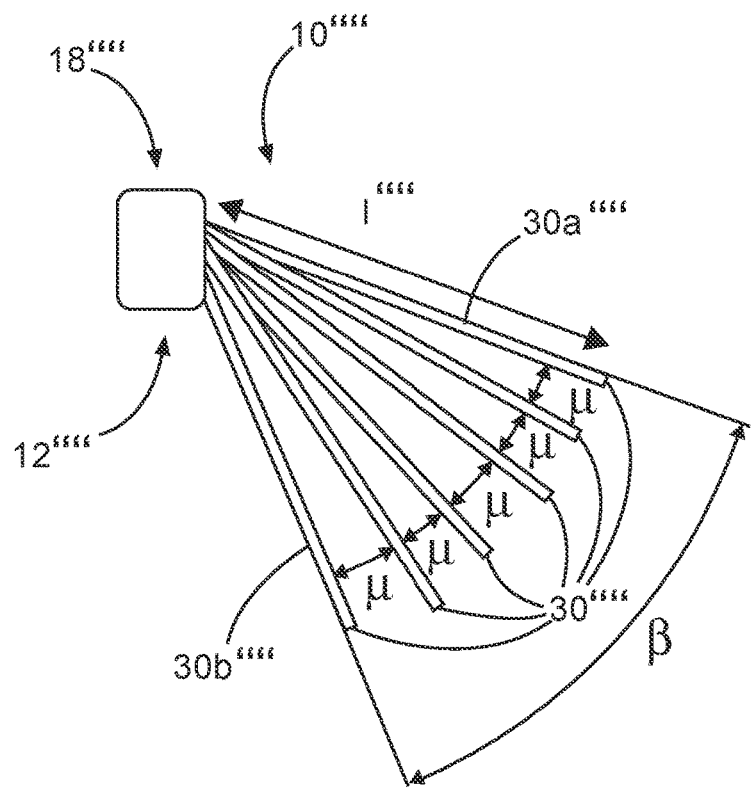
FIG. 13a: is a side view of another embodiment of a clip line fixture according to the present invention.
Figure 13B:
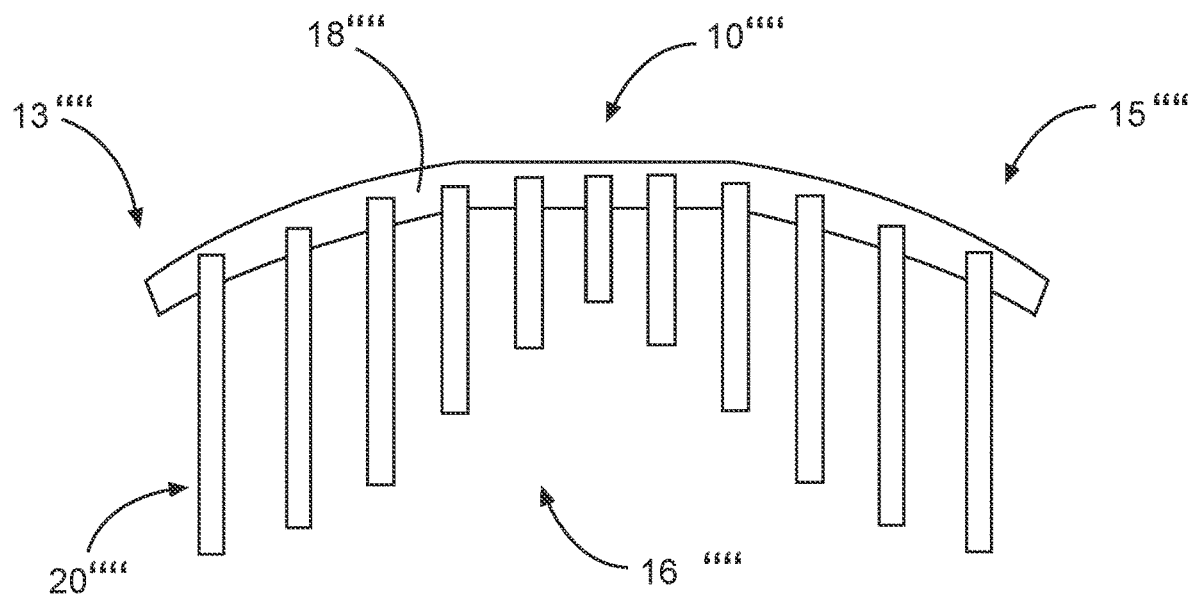
Figure 14:
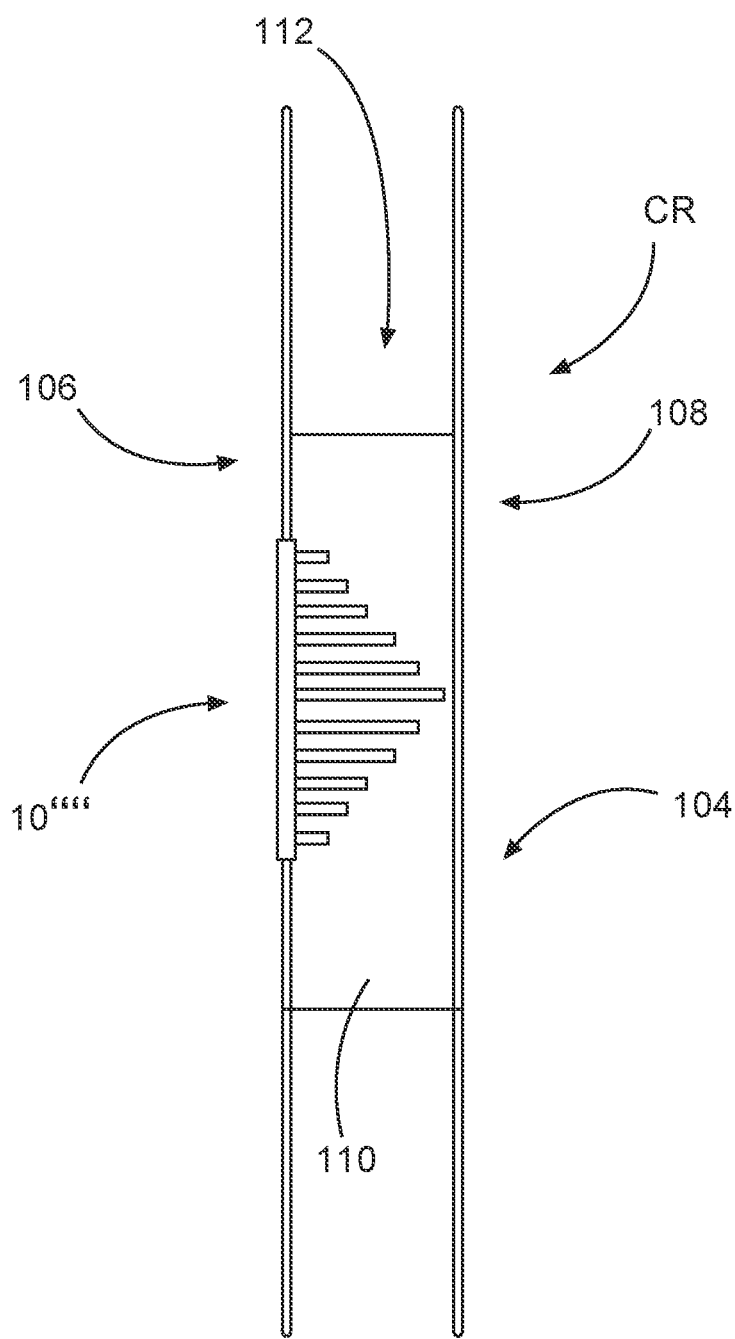
FIG. 14: is a top view of another embodiment of a clip reel assembly according to the present invention, comprising the clip line fixture of FIGS. 13a, 13b and a clip reel.

FIGS. 13a through 14 show different views of clip line fixture 10'''', which is similar to clip line fixtures 10, 10', 10", 10''' of FIGS. 1 through 12. A particular difference between the previously described embodiments and clip line fixture 10'''' lies in hold-down portion 16'''' being configured to extend from a side wall of a clip reel into a clip line winding space of the clip reel. In particularly preferred embodiments, hold-down portion 16'''' is configured to extend in a direction at least substantially perpendicular to a circumferential direction of the clip reel, as is depicted in FIG. 14 with clip reel CR. In the depicted embodiment, clip line fixture 10'''' comprises fanned engagement portion 20'''' having a plurality of flexible engagement elements 30'''' of at least substantially similar, preferably substantially equal, length l''''. Each of flexible engagement elements 30'''' is configured to extend away from base portion 18'''' perpendicular to a circumferential direction of a clip reel, preferably clip reel CR as depicted in FIG. 14. Clip line fixture 10'''' is configured to be attached to a clip reel, such as to clip reel CR as depicted in FIG. 14. In particular, base portion 18'''' is curved to substantially follow the curvature of a portion of an outer rim portion 118, 120 of a clip reel, such as outer rim portion 118, 120 of clip reel CR. Base portion 18'''' comprises an attachment portion 12'''' extending between first and second side portions 13'''', 15'''' of clip line fixture 10'''' for attaching clip line fixture 10'''' to a mating portion of the clip reel, such as any one of first and second mating portions 102, 104 of clip reel CR, in the manner described above.

In the depicted embodiment, engagement portion 20'''' is provided with its characteristic fanned structure through the arrangement of flexible engagement elements 30''''. When viewed from the side as depicted in FIG. 13a, the plurality of flexible engagement elements 30'''' extend from base portion 18'''' perpendicular to a longitudinal axis of base portion 18'''' at different angles. In particular, when viewed from the side as depicted in FIG. 13a, the plurality of flexible engagement elements 30'''' enclose a fanning angle β between uppermost or radially outermost flexible engagement element 30a'''' and lowermost or radially innermost flexible engagement element 30b''''. An angular spacing μ between adjacent flexible engagement elements 30'''' in the plane of view of FIG. 13a, is preferably constant throughout fanned engagement portion 20''''. Alternatively, the angular spacing μ between adjacent flexible engagement elements 30'''' varies between different throughout fanned engagement portion 20''''. FIG. 14 shows the advantage of fanned engagement portions 20''''. The plurality of flexible engagement elements 30'''' extend into clip line winding space such that their free ends lie at different axial distances from side walls 106, 108 and at different radial distances from outer circumferential surface 110 of hub portion 103. Thereby, a great range of possible positions of a free end of a clip line is covered by respective free ends of flexible engagement elements 30'''', advantageously decreasing the time required to find a proper position for engaging and thus securing the clip line.

Aside from at least comprising fanned engagement portion 20'''', clip line fixture 10'''' may comprise any or all of the features described herein in conjunction with other embodiments of the clip line fixture according to the first aspect, in particular any or all of the features depicted in and/or described in conjunction with FIGS. 1 through 12.

Figure 15A:
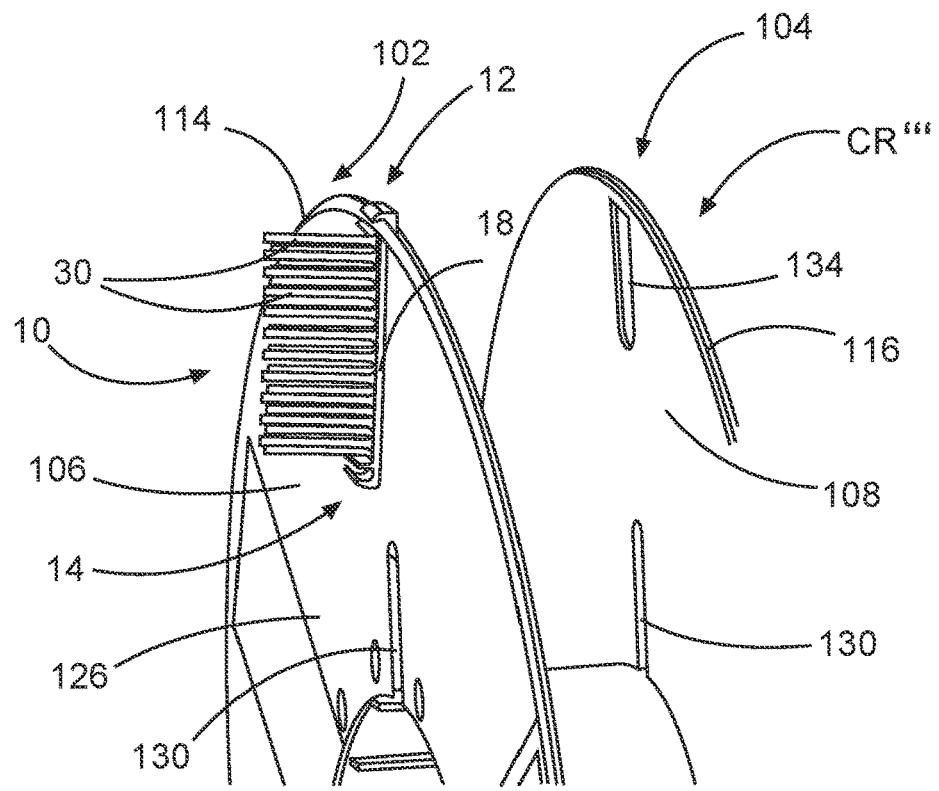
FIG. 15a: is a perspective view of a clip reel assembly according to the present invention with a clip line fixture being attached to a clip reel in a release position.
Figure 15B:
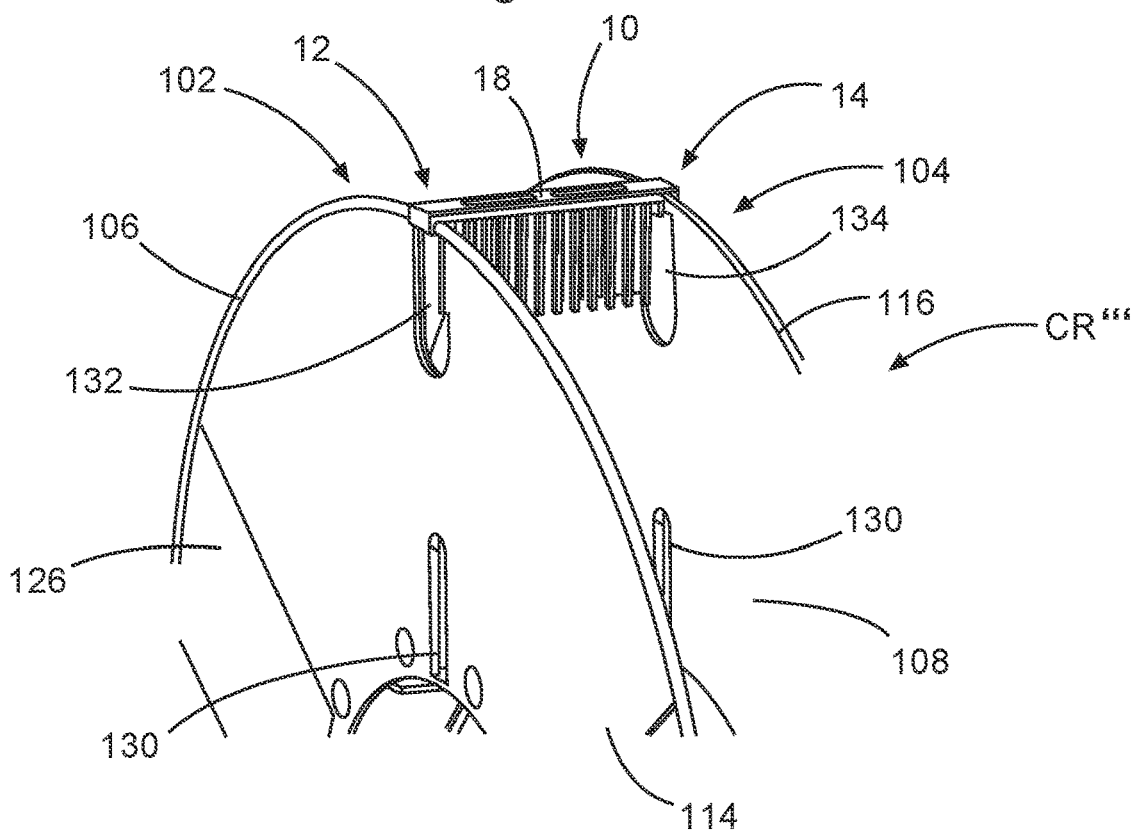
FIG. 15b: is a perspective view of the clip reel assembly of FIG. 15a with the clip line fixture being attached to the clip reel in a securing position.

FIGS. 15a and 15b show a particularly advantageous application of clip line fixture 10 of FIGS. 1 through 3, in which first attachment portion 12 doubles as a hinge portion configured to pivotally attach clip line fixture 10 to a particularly preferred embodiment of clip reel CR'''. In FIG. 15a, clip line fixture 10 is attached to first mating portion 102 of clip reel CR''' in a release position, in which a free end of the clip line (not depicted) is not secured and therefore allows to unwind the clip line from the clip reel CR'''. To secure the clip line, clip line fixture 10 is pivoted around first attachment portion 12 into a securing position depicted in FIG. 15b, in which second attachment portion 14 is attached to second mating portion 104. Pivoting clip line fixture 10 around first attachment portion 12 allows to move clip line fixture 10 between the release position and the securing position. It has to be understood that the inherent symmetry of the depicted embodiment also allows to pivot clip line fixture 10 around second hinge portion 14, which can likewise double as a hinge portion.

Clip reel CR''' depicted in FIGS. 15a and 15b is generally similar to previously described clip reels CR, CR', but further comprises a first storing recess 132 provided in first side wall 106 radially inward from and immediately adjacent to first bulge 114 and a second storing recess 134 provided in second side wall 108 radially inward from and immediately adjacent to second bulge 116. Storing recesses 132, 134 are configured to at least partially house clip line fixture 10 in the release position, as exemplified in FIG. 15b, in which a portion of clip line fixture 10, in particular a portion of base portion 18, is recessed in storing recess 132. The provision of storing recesses 132, 134 advantageously increases the pivoting angle between the release position and the securing position. In particular in the depicted embodiment, the release position is a position in which the flexible engagement elements 30 extend substantially axially outward from outer face 126 of first side wall 106. Similar to holder 130, storing recesses 132, 134 reduce the risk of interference with other machine parts when keeping clip line fixture 10 physically connected to clip reel CR''' in the release position during operation of a clipping machine.

It has to be understood however, that the presence of recesses 132, 134 is not necessary for pivoting clip line fixture 10 to a release position. For example, above discussed embodiments of clip reel CR, CR'' also allow to a pivot clip line fixture to a release position. If it is desired to achieve the same rotational range with such clip reels CR, CR'', further embodiments of clip line fixture 10 comprise dedicated hinge portions, readily available from the state of the art, that are configured to provide a sufficient rotational range. These hinge portions may be provided in addition to or as a replacement for first and/or second attachment portions 12, 14.

Figure 16:
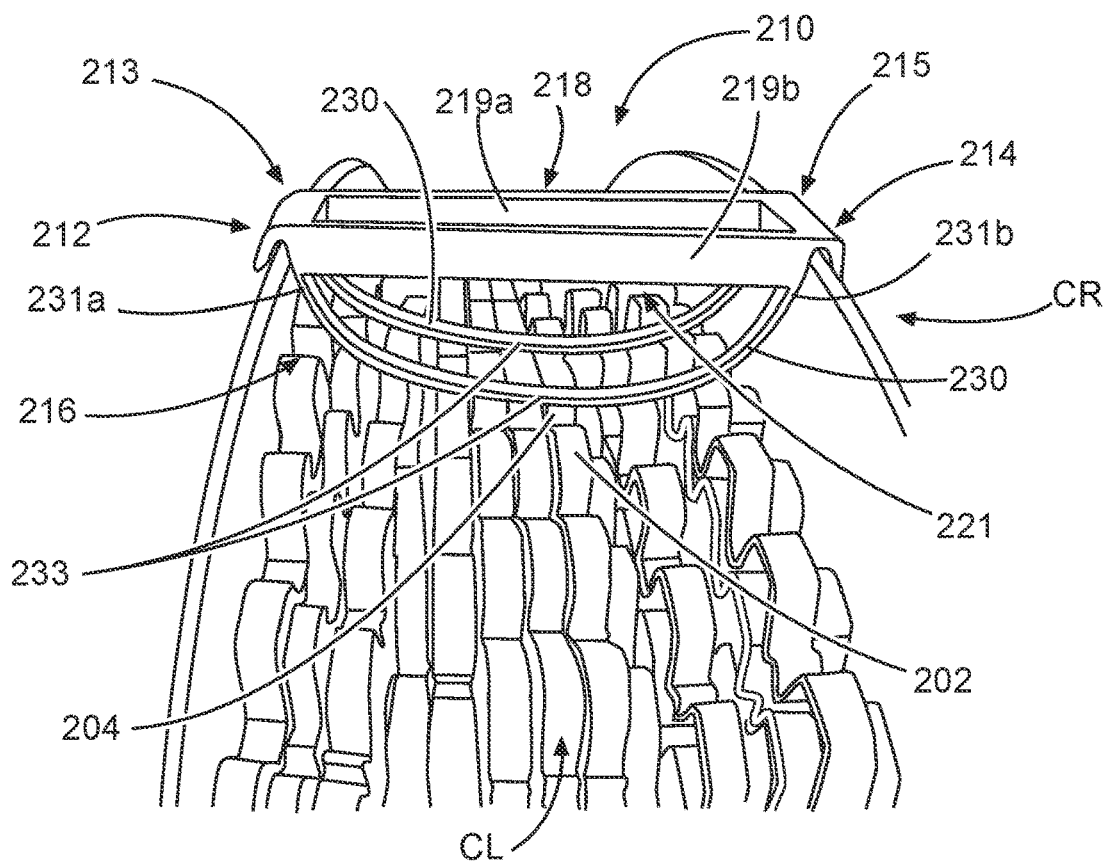
FIG. 16: is a perspective view of another embodiment of a clip line fixture according to the present invention attached to a clip reel.

FIG. 16 depicts an embodiment of a clip line fixture 210 with arch-shaped flexible engagement elements 230 while attached to previously described clip reel CR. Clip line fixture 210 comprises a first attachment portion 212, a second attachment portion 214, a hold-down portion 216 and a base portion 218 extending between first and second attachment portions 212, 214. Hold-down portion 216 comprises a pair of arch-shaped flexible engagement elements 230 extending over lower face 221 of base portion 218. Each of arch-shaped flexible engagement elements 230 comprises a first fixed portion 231a at which arch-shaped flexible engagement element 230 extends from a first side portion 213 of clip line fixture 210, a second fixed portion 231b at which arch-shaped flexible engagement element 230 extends from a second side portion 215 of clip line fixture 210 and an arch-shaped engagement portion 233 extending between first and second fixed portions 231a, 231b. Arch-shaped flexible engagement elements 230 are configured such that respective engagement portion 233 is deflectable in a direction perpendicular to their lengthwise extent, in the depicted embodiment effectively leading to a resilient rotation around an axis defined through fixed portions 231a, 231b. When attached to a clip reel, such as to clip reel CR as depicted in FIG. 16, this translates to a flexibility in a circumferential direction of clip reel CR. Thereby, flexible engagement elements 230, for example when clip line fixture 210 is being attached to clip reel CR, are deflectable when contacting peaks 202 of clip line CL, and are thus reliably guided into engagement with troughs 204 without the need for exact alignment.

Other than arch-shaped flexible engagement elements 230, clip line fixture 210 is generally similar to above described clip line fixtures 10, 10', 10'', 10''', 10'''' and may comprise any or all of the features described herein in conjunction with other embodiments of the clip line fixture according to the first aspect, in particular any or all of the features depicted in and/or described in conjunction with FIGS. 1 through 15b.

In the depicted embodiment, for optionally providing improved engagement of troughs 204, base portion 218 is comprised of two separate sub-bars 219a, 219b, in the form of I-beams providing higher bending stiffness in a direction corresponding to the radial direction of clip reel CR and lower bending stiffness in a direction tangential to the circumferential direction of clip reel CR. The flexibility of sub-bars 219a, 219b therefore adds to the flexibility of flexible engagement elements 230, to allow for a greater total deflection of engagement portion 233.

Figure 17:
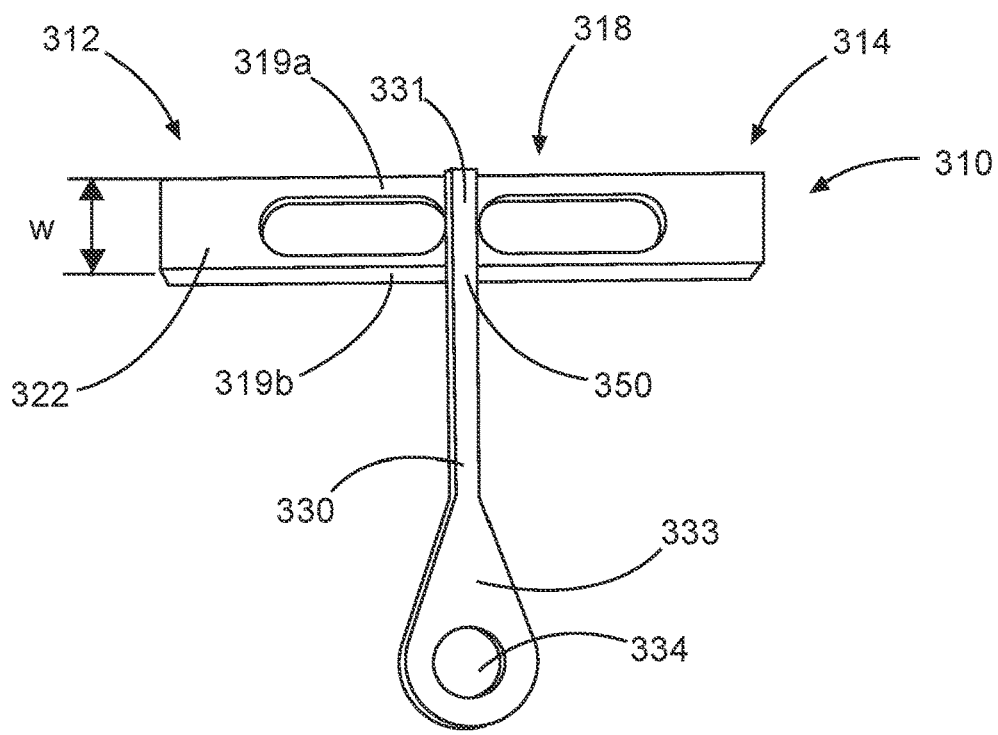
FIG. 17: is a top view of another embodiment of a clip line fixture according to the present invention.

FIG. 17 depicts an embodiment of a clip line fixture 310 having a flexible engagement element 330 with an eyelet 334 formed at a free end 333. Clip line fixture 310 further comprises a base portion 318 and first and second attachment portions 312, 314 generally similar to those described above. Flexible engagement element 330 further has a fixed end 331 connected to and extending from a central portion of upper face 322 of base portion 318, in particular from a connection portion 350 connecting sub-bars 319a, 319b as described above. As exemplified by FIG. 17 and in particular distinction from clip line fixture 10 depicted in FIGS. 1 through 4, flexible engagement element 330 extends from base portion 318 in a direction defined by width w thereof.

When attached to a clip reel, flexible engagement element 330 can thus be either in an equilibrium position as depicted in FIG. 17, i.e. extending tangentially to a circumferential direction of the clip reel, or in an engagement positon in which a free end of a clip line wound around the clip reel extends through eyelet 330, thereby flexing flexible engagement element 330 radially inward around its fixed end 331. Such a configuration may advantageously enable to release the free end of the clip line by removing it from eyelet 334, without having to remove clip line fixture 310 from the clip reel. When attaching clip line fixture 310 to the clip reel, eyelet 334 is advantageously first advanced over the free end of the clip line, before attaching attachment portions 312, 314 to the corresponding mating portions and thereby fixing the free end relative to the clip reel.

Other than flexible engagement element 330 having eyelet 334, clip line fixture 310 is generally similar to above described clip line fixtures 10, 10', 10", 10''', 10"", 210 and may comprise any or all of the features described herein in conjunction with other embodiments of the clip line fixture according to the first aspect, in particular any or all of the features depicted in and/or described in conjunction with FIGS. 1 through 16.

Figure 18A:
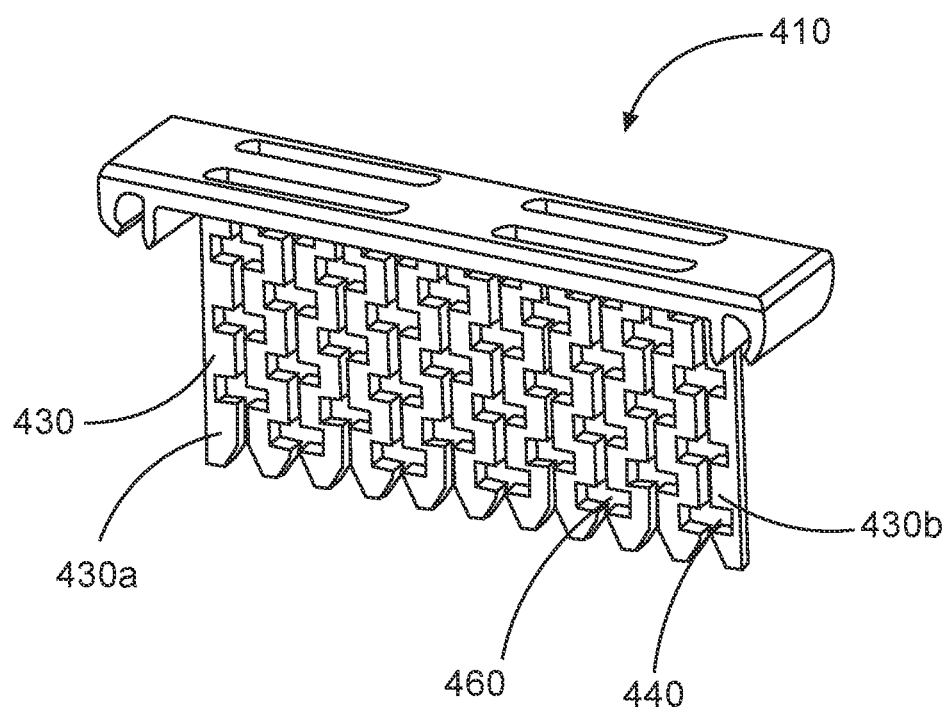
FIG. 18a: is a perspective view of another embodiment of a clip line fixture according to the present invention.
Figure 18B:
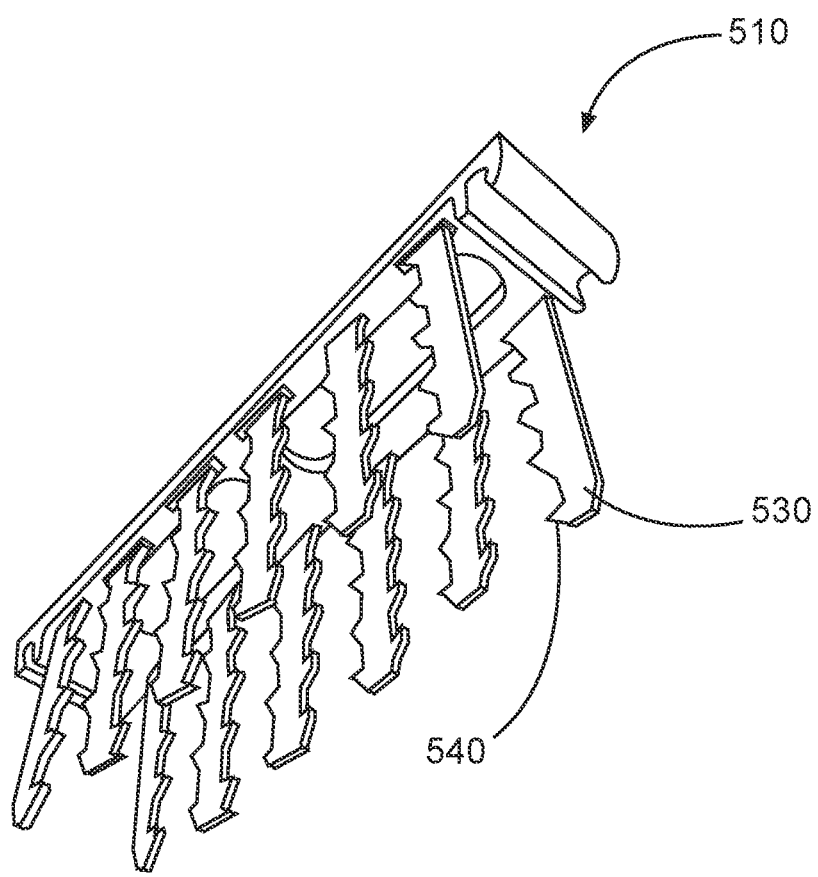
FIG. 18b: is a perspective view of another embodiment of a clip line fixture according to the present invention.

FIGS. 18*a* and 18*b* depict two embodiments of clip line fixtures 410, 510, similar in configuration to clip line fixture 10 of FIGS. 1 through 4, with flexible engagement elements 430, 530 further having interlocking members 440, 540 configured to interlock with portions of a clip line. In the embodiment of clip line fixture 410 of FIG. 18*a*, interlocking members are provided in the form of a plurality of recesses 440 in each of flexible engagement elements 430 aligned with and facing a corresponding recess 440 in an adjacent flexible engagement element 430. In the depicted embodiment, all but the two outermost flexible engagement elements 430*a*, 430*b* are thus shaped in an undulating pattern of alternating kinks. Each pair of aligned and facing recesses 440 forms a channel-like seat 460 configured for receiving a portion of the clip line therethrough. Channel-line seat 460 has a width adapted to but smaller than a width of the clip line expected to extend therethrough, such that the clip line is resiliently clamped therebetween. In the embodiment of clip line fixture 510 of FIG. 18*b*, interlocking members are provided in the form of a plurality of shark teeth 540 extending laterally outward from flexible engagement elements 530. When attaching clip line fixture 410, 510 to a clip reel, flexible engagement elements 430, 530 deflect upon being brought into contact with the clip line, such that interlocking members 440, 540 interlock with portions of the clip line.

Interlocking members 440, 540 advantageously further restrict the range of motion of a free end of a clip line engaged by flexible engagement elements 430, 530 in a direction radially inward with respect to the clip reel. In particular, it is thereby advantageously enabled to maintain engagement of the free end of the clip line in cases in which the length of the flexible engagement elements does not suffice to bias the free end radially inward and for example against outer surface 110 of hub portion 103 of clip reel CR.

Other than flexible engagement elements 430, 530 having interlocking members 440, 540, clip line fixtures 410, 510 are generally similar to above described clip line fixtures 10, 10', 10", 10''', 10"", 210, 310 and may comprise any or all of the features described herein in conjunction with other embodiments of the clip line fixture according to the first aspect, in particular any or all of the features depicted in and/or described in conjunction with FIGS. 1 through 17.

Figure 19A:
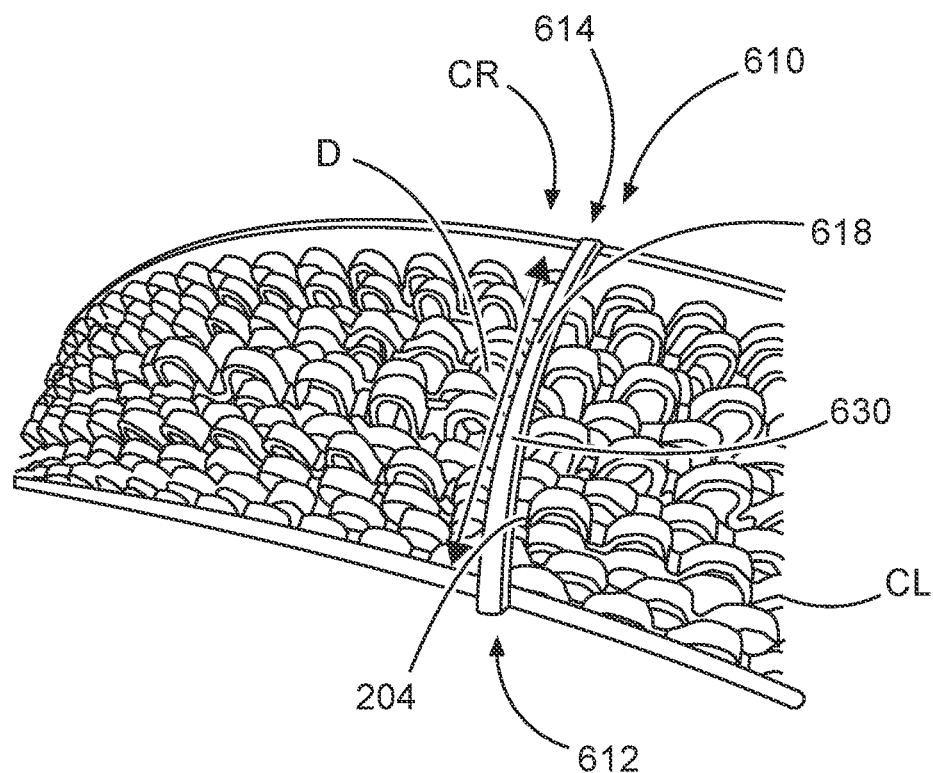
FIG. 19a: is a perspective view of another embodiment of a clip line fixture according to the present invention attached to a clip reel.
Figure 19B:
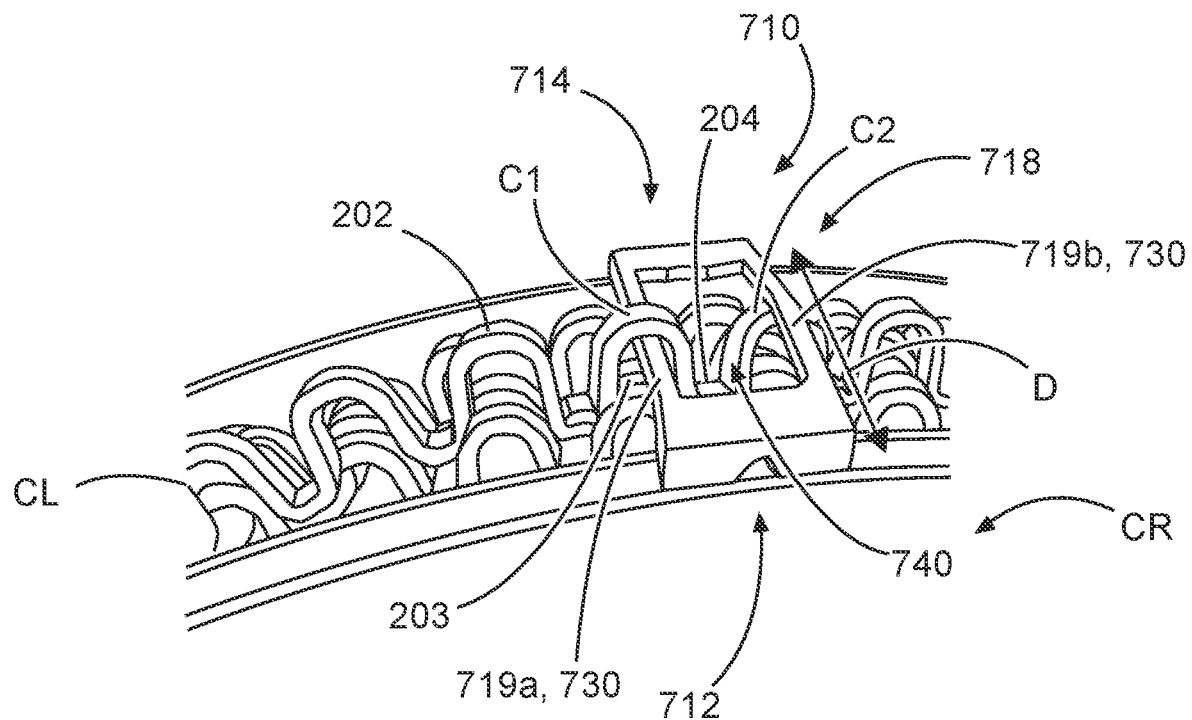
FIG. 19b: is a perspective view of another embodiment of a clip line fixture according to the present invention attached to a clip reel.

Embodiments of clip line fixtures 610, 710 in which base portions 618, 718 comprise flexible engagement elements 630, 730 configured to engage corresponding portions of clip line CL wound around clip reel CR are depicted in FIGS. 19*a* and 19*b*. Flexible engagement elements 630, 730 are further configured to provide bridging distance D between first and second attachment portions 612, 614 and 712, 714 respectively.

In the embodiment of FIG. 19*a*, i.e. clip line fixture 610, a base portion 618 is formed as an elongate flexible member doubling as a flexible engagement element 630 configured to engage troughs 204 of clip line CL wound around clip reel CR. Base portion 618 is configured to resiliently deflect as depicted in FIG. 19*a*, for example when pressing against peak 202 of clip line CL, for guiding base portion 618 into engagement with trough 204 without the need for precise alignment.

Clip line fixture 710 comprises a base portion 718 having a pair of flexible sub-bars 719*a*, 719*b* configured to engage portions of clip line CL, thereby doubling as flexible engagement elements 730. Sub-bars 719*a*, 719*b* are separated by a window 740, configured for receiving a portion of clip line CL. FIG. 19*b* depicts a particular advantageous use of clip line fixture 710, in which clip line CL is threaded through window 740 with a first clip C1 passing over first sub-bar 719*a* and an adjacent second clip C2 passing underneath second sub-bar 719*b*. In this manner, second sub-bar 719*b* exerts a force on second clip C2 directed radially inward which is transferred along clip line CL to first clip C1 which in turn presses radially inward against first sub-bar 719*a*. The portion of clip line CL which is accommodating clips C1, C2 and which is engaged by clip line fixture 710 is thus secured against moving in a longitudinal direction, substantially corresponding to the circumferential direction of clip reel CR, as well as against moving in a direction of its undulation pattern, substantially corresponding to the radial direction of clip reel CR.

It has to be understood, however, that clip line fixture 710 is not limited to being used in the manner depicted in FIG. 19*b*. In particular, clip line fixture 710 may be attached to clip reel CR similar to clip line fixture 610 in FIG. 19*a*, i.e. without threading clip line CL through window 740 so that clips C1, C2 are both situated radially below clip line fixture 710. When thus attached, the flexibility of sub-bars 719*a*, 719*b* enables them to deflect in a direction tangential to the circumferential direction of clip reel CR, as described above in conjunction with and depicted in FIG. 16.

Other than comprising base portions 618, 718 doubling as flexible engagement elements 630, 730, clip line fixtures 610, 710 are generally similar to above described clip line fixtures 10, 10', 10", 10''', 10"", 210, 310, 410, 510 and may comprise any or all of the features described herein in conjunction with other embodiments of the clip line fixture according to the first aspect, in particular any or all of the features depicted in and/or described in conjunction with FIGS. 1 through 18*b*.

The depicted embodiments of clip line fixtures 10, 10', 10", 10''', 10"", 210, 310, 410, 510, 610, 710 are formed from a monolithic piece of material. In particular, clip line fixtures 10, 10', 10", 10''', 10"", 210, 310, 410, 510, 610, 710 and other embodiments thereof may be injection molded, preferably from a suitable thermoplastic. More preferably, clip line fixtures 10, 10', 10", 10''', 10"", 210, 310, 410, 510, 610, 710 and other embodiments thereof comprise polypropylene (PP). It has to be understood however that in other embodiments, clip line fixtures 10, 10', 10", 10''', 10"", 210, 310, 410, 510, 610, 710 are assembled from a plurality of parts, preferably by welding and/or using adhesives such as glue.

The invention claimed is:

1. A clip line fixture suitable for use with a clip line wound around a clip reel, the clip line fixture comprising:
- at least one attachment portion configured to be removably attachable to a mating portion of a clip reel for attaching the clip line fixture to the clip reel; and
- a hold-down portion comprising a plurality of flexible engagement elements shaped to engage at least one corresponding portion of a free end portion of a clip line wound around the clip reel, wherein the plurality of flexible engagement elements are of substantially longitudinal shape and each comprise a fixed end and a free end opposite the fixed end;
- wherein the at least one attachment portion and the hold-down portion are configured such that the free end portion of the clip line wound around the clip reel is securable at least against radially separating from the clip reel by attaching the at least one attachment portion to the mating portion; and
- wherein the plurality of flexible engagement elements are arranged in a comb-like pattern forming at least one row of flexible engagement elements.

2. The clip line fixture of claim 1, further comprising a base portion connecting the at least one attachment portion and the hold-down portion.

3. The clip line fixture of claim 2, wherein a first attachment portion is provided at a first side portion of the clip line fixture and a second attachment portion is provided at a second side portion of the clip line fixture opposite the first side portion.

4. The clip line fixture of claim 3, wherein the base portion is configured to provide a bridging distance between the first attachment portion and the second attachment portion for bridging a separation between a first mating portion and a second mating portion of the clip reel, wherein the base portion is configured to provide a variable bridging distance.

5. The clip line fixture of claim 2, wherein the base portion comprises at least a first flexible portion, a second flexible portion and at least one stiffening portion provided between the first flexible portion and the second flexible portion.

6. The clip line fixture of claim 2, wherein the plurality of flexible engagement elements extend laterally from the base portion.

7. The clip line fixture of claim 1, wherein the plurality of flexible engagement elements are configured such that the free end is deflectable.

8. The clip line fixture of claim 1, wherein the plurality of flexible engagement elements arranged in said comb-like pattern form a first row of flexible engagement elements and a second row of flexible engagement elements.

9. The clip line fixture of claim 1, wherein the hold-down portion comprises a first flexible engagement portion and a second flexible engagement portion, wherein each of the first and second flexible engagement portions comprises at least one flexible engagement element.

10. The clip line fixture of claim 9, wherein the first flexible engagement portion and the second flexible engagement portion extend in parallel to one another.

11. The clip line fixture of claim 9, wherein the first flexible engagement portion and the second flexible engagement portion extend in different directions enclosing an angle of 120° or less, preferably enclosing an angle of 15° or more and/or 75° or less, more preferably enclosing an angle of 35° or more and/or 65° or less.

12. The clip line fixture of claim 1, wherein the at least one attachment portion provides a clamp segment shaped to releasably mate with the corresponding mating portion of the clip reel through positive locking and/or force locking.

13. The clip reel for storing a clip line wound thereon and configured for use with a clip line fixture as defined in claim 1, the clip reel comprising:
- a hub portion defining a central axis;
- a first side wall and a second side wall each extending radially outward from an outer circumferential surface of the hub portion, wherein the first side wall and the second side wall are axially spaced so as to define a clip line winding space therebetween;
- a first mating portion provided by the first side wall and a second mating portion provided by the second side wall, each mating portion configured for removably attaching a correspondingly shaped attachment portion of a clip line fixture to the clip reel;
- wherein each of the first mating portion and the second mating portion comprise a bulge extending along an outer rim portion of the corresponding side wall; and
- wherein at least one of the first mating portion and the second mating portion comprises a circumferentially extending locking groove provided in the corresponding side wall; and
- wherein the circumferentially extending locking groove of the first mating portion and/or the second mating portion is arranged radially inward from the corresponding bulge.

14. The clip reel of claim 13, wherein the circumferentially extending locking groove of the first mating portion and/or the second mating portion is arranged immediately adjacent to the corresponding bulge.

15. The clip reel assembly comprising:
- a clip reel comprising:
  - a hub portion defining a central axis;
  - a first side wall and a second side wall each extending radially outward from an outer circumferential surface of the hub portion, wherein the first side wall and the second side wall are axially spaced so as to define a clip line winding space therebetween;
- a clip line wound around the clip reel so as be located in the clip line winding space of the clip reel; and
- a clip line fixture as defined in claim 1 removably attached to the clip reel.

* * * * *